(12) United States Patent
Rapaport et al.

(10) Patent No.: US 11,262,293 B2
(45) Date of Patent: Mar. 1, 2022

(54) SYSTEM AND METHOD FOR USE IN HIGH SPATIAL RESOLUTION ELLIPSOMETRY

(71) Applicant: Ralfy Kenaz, Jerusalem (IL)

(72) Inventors: Ronen Rapaport, Tel Aviv (IL); Ralfy Kenaz, Jerusalem (IL)

(73) Assignee: Ralfy Kenaz, Jerusalem (IL)

( * ) Notice: Subject to any disclaimer, the term of this patent is extended or adjusted under 35 U.S.C. 154(b) by 0 days.

(21) Appl. No.: 16/483,877

(22) PCT Filed: Feb. 8, 2018

(86) PCT No.: PCT/IL2018/050147
§ 371 (c)(1),
(2) Date: Aug. 6, 2019

(87) PCT Pub. No.: WO2018/146681
PCT Pub. Date: Aug. 16, 2018

(65) Prior Publication Data
US 2020/0025678 A1    Jan. 23, 2020

Related U.S. Application Data

(60) Provisional application No. 62/456,268, filed on Feb. 8, 2017.

(51) Int. Cl.
*G01J 4/04* (2006.01)
*G01N 21/21* (2006.01)
(Continued)

(52) U.S. Cl.
CPC ........ *G01N 21/211* (2013.01); *G01B 11/0641* (2013.01); *G01J 4/04* (2013.01);
(Continued)

(58) Field of Classification Search
CPC ........... G01N 21/211; G01N 2021/213; G01B 11/0641
See application file for complete search history.

(56) References Cited

U.S. PATENT DOCUMENTS 5,042,951 A   8/1991  Gold et al.
5,408,322 A   4/1995  Hsu et al.
(Continued)

FOREIGN PATENT DOCUMENTS

DE   4017935 A1   12/1991
EP   1640706 A1   3/2006

OTHER PUBLICATIONS

Sang-Heon Ye et al.: "Angle-resolved annular data acquisition method for microellipsometry". Optics express, vol. 15, No. 26, Dec. 18, 2007, pp. 18056-18065.

*Primary Examiner* — Maurice C Smith
(74) *Attorney, Agent, or Firm* — Browdy and Neimark, P.L.L.C.

(57) ABSTRACT

System and method for use in optical monitoring of a sample. The system comprising: a light source unit (140) for providing collimated illumination; polarization modulation unit (160) located in optical path of light propagating from the light source unit; a lens unit (120) for focusing light onto an illumination spot on a surface of a sample, and for collection of light components returning from the sample; a light collection unit configured for collecting light returning from the sample and generate output image data associated with Fourier plane imaging with respect to surface of the sample; and a control unit (500) configured processing said data in accordance with said system calibration. The method provides calibration data, and comprising: providing reference data indicative of complex refractive index of the reference samples on at least two reference samples; collecting ellipsometry data for said at least two reference samples using the ellipsometry system, generating output data having a plurality of data pieces, each associated with unknown angular direction; and for each data piece corresponding to an unknown angular direction, determining simultaneously system parameters and angle of incidence in accordance with corresponding parameters of the reference data to thereby determine calibration data.

20 Claims, 18 Drawing Sheets

(51) Int. Cl.
    *G01B 11/06*     (2006.01)
    *G01N 21/27*     (2006.01)

(52) U.S. Cl.
    CPC ..... *G01N 21/274* (2013.01); *G01N 2021/213* (2013.01); *G01N 2021/214* (2013.01)

(56) References Cited

U.S. PATENT DOCUMENTS

| | | | | |
|---|---|---|---|---|
| 5,596,411 | A * | 1/1997 | Fanton | G01N 21/211 356/328 |
| 6,052,188 | A * | 4/2000 | Fluckiger | G01J 4/04 356/369 |
| 7,321,426 | B1 * | 1/2008 | Poslavsky | G01N 21/211 356/369 |
| 7,400,403 | B2 | 7/2008 | Opsal | |
| 10,823,663 | B2 * | 11/2020 | Liu | G01N 21/21 |
| 2005/0248773 | A1 | 11/2005 | Rosenewaig | |
| 2006/0114470 | A1 * | 6/2006 | Takashima | G01B 11/0625 356/453 |
| 2008/0088849 | A1 | 4/2008 | De Lega et al. | |
| 2009/0225317 | A1 * | 9/2009 | Tanaka | G01N 21/211 356/369 |
| 2013/0265576 | A1 | 10/2013 | Acher | |
| 2016/0061585 | A1 * | 3/2016 | Seo | G01B 11/065 356/369 |
| 2016/0161245 | A1 | 6/2016 | Fu et al. | |

* cited by examiner

GENERAL ART

DIRECTING COLLIMATED BEAM ONTO THE SAMPLE FOR FORMING ALIGNMENT SPOT ON THE DETECTOR ARRAY
1710

DETERMINING VARIATION IN LOCATION OF THE ALIGNMENT SPOT WITH RESPECT TO REFERENCE LOCATION
1720

GENERATING SYSTEM COMMAND TO THE SAMPLE HOLDER FOR VARYING ORIENTATION TO ALIGN THE SAMPLE
1730

PROCEEDING WITH MEASUREMENT OF THE SAMPLE
1740

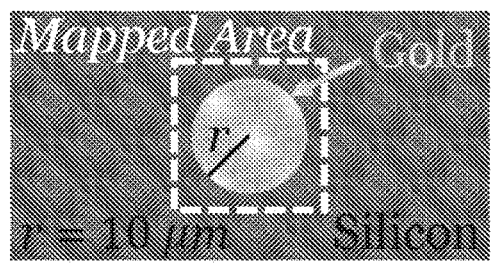
Fig. 21
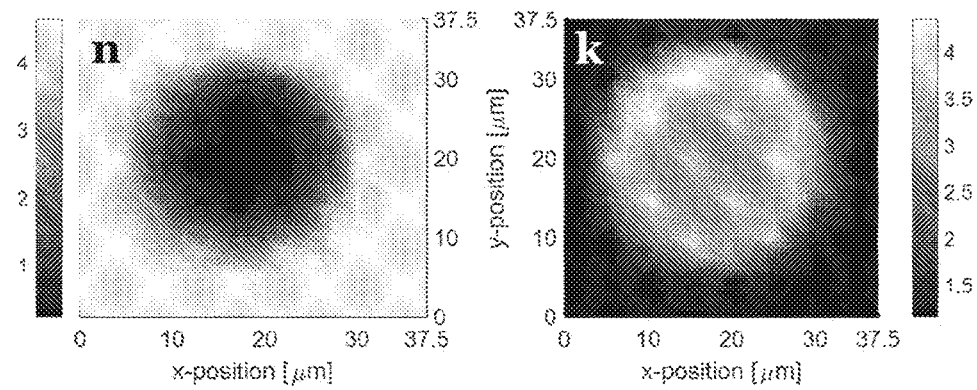
Fig. 22A
Fig. 22B

SYSTEM AND METHOD FOR USE IN HIGH SPATIAL RESOLUTION ELLIPSOMETRY

TECHNOLOGICAL FIELD

The invention is in the field of ellipsometry measurement systems and techniques and is particularly relevant for high spatial resolution ellipsometry measurement systems, and for ellipsometry measurements of samples with arbitrary landscape.

BACKGROUND

Ellipsometry is a widely used tool both in industry and research for determining optical constants and thickness of various optical materials and thin films. Ellipsometry is a very sensitive tool for thickness variations of films, down to the Angstrom resolution, and to minute changes in film properties. The conventional techniques for ellipsometry measurements generally utilize illumination of a sample surface at a selected angle of incidence and collecting measurements of light reflected from the sample having at least two different polarization states. Various techniques may provide measurements at plurality of angular directions such as.

U.S. Pat. No. 7,400,403 describes an optical inspection device including a light source for generating a probe beam. The probe beam is focused onto a sample to create a spread of angles of incidence. After reflecting from the sample, the light is imaged onto a two-dimensional array of photodetectors. Prior to reaching the detector array, the beam is passed through a rotating compensator. A processor functions to evaluate the sample by analyzing the output of the photodetectors lying along one or more azimuthal angles and at different compensator positions.

EP 1,640,706 relates to an apparatus for determining simultaneously wavelength and incidence angle resolved reflectivity and/or ellipsometric properties of a sample (3), comprising: an illumination device (5) comprising a Fourier lens (17) for illuminating a surface portion (7) of the sample (3) with a multi wavelength light beam under a plurality of incidence angles ($\alpha$), a first optical system comprising the Fourier lens (17) configured to transform an angular light distribution of the multi wavelength light beam reflected from the surface portion of the sample (3) into a positional light distribution in the Fourier plane (15) of the Fourier lens (17), a second optical system comprising an imaging lens (13, 27) for imaging the positional light distribution onto an entrance slit (23) of an imaging spectrograph (25), wherein the imaging spectrograph (25) is configured to disperse the positional light distribution as a function of wavelength essentially perpendicular to its entrance slit (23), and a detector (29), positioned at the exit of the imaging spectrograph (25), with a predetermined amount of pixels arranged in a two dimensional matrix form wherein each pixel of the detector (29) produces an electric signal proportional to the reflectance of the surface portion (7) of the sample (3) for a given incidence angle and a given wavelength. The invention furthermore relates to a corresponding method.

General Description

There is a need in the art for a system and a method for ellipsometry measurements enabling high spatial resolution ellipsometric measurements and suitable characterization of sample surface. The ellipsometry system and measurement technique described herein may provide a very useful tool not only for characterizing homogeneous films as done today, but also for measuring local material properties, thickness, and inhomogeneities at micron-scale along the surface. Such measurement is generally highly beneficial for various applications in many fields, including for example: Microelectronics and Semiconductor Industries, Flat Panel Display Industries, Material Sciences, Optical Coating Processes, Photovoltaics Industries, Biotechnology and Surface Chemistry, Optoelectronics and LED Industries.

Generally, current commercial ellipsometry measurement systems (herein referred to at times as ellipsometers) utilize illumination of a sample with very large illumination spot (mostly in millimeter-scale), which strongly inhibits their ability to measure local properties. Furthermore, these ellipsometry measurement systems typically require a predetermined fixed alignment of angular orientation of the sample's surface. These two limitations do not allow ellipsometers to measure non-flat samples or samples that have micron-scale landscape, which is very abundant in modern industry and research. Finally, most conventional ellipsometers are very bulky and expensive tools, requiring at least two large movable mechanical arms for angle alignment. Furthermore, such ellipsometers are generally standalone systems that are very difficult to integrate with other characterization tools, such as optical microscopes for example.

The present invention provides a novel configuration of a scanning High Spatial Resolution Ellipsometer (HSRE), which allows obtaining complex refractive indices and thickness values of surfaces with a sub 10-micron spatial resolution and over a broadband spectrum. Furthermore, the system also has the ability to make ellipsometric measurements of micron-scale curved or tilted surfaces with high spatial resolution. Importantly, this ellipsometer system may be based on conventional optical microscope geometry, and can be easily integrated into and functionalize a high-resolution microscope.

Generally, the ellipsometer system according to the present invention may require certain calibration process for identifying data points of signal collection with respect to angles of incidence of light components and wavelengths for obtaining the ellipsometric parameters with the required accuracy. It should be noted that the technique of the present invention enables sufficient measurement accuracy for obtaining thickness measurement of layers within tenth of nanometer range. Thus, the technique of the present invention provides calibration of the High Spatial Resolution Ellipsometer (HSRE) system providing angular and wavelength indication of data collected by the system. Furthermore, the ellipsometer system according to some embodiments of the invention may be configured with a control unit, generally a computer unit comprising one or more processors and memory utility, configured for performing selected data processing operations for calibrating the system measurements as described herein below.

Generally, high spatial resolution ellipsometry based on imaging the Fourier plane (or back focal plane) of a lens unit, e.g. an objective lens operating as Fourier lens, has been of interest since the late 1980's. However it was never demonstrated with sufficient accuracy and simplicity level thus preventing commercial production and wide use. Such Fourier plane imaging techniques/methods are typically very sensitive to calibration, and thus require an accurate method assigning data points with information about accurate angular incidence of light components. This is the key that is enabling accurate and simple functioning of high spatial resolution ellipsometry based on imaging the Fourier plane of the lens unit. In addition, the present invention provides a micro-alignment technique, enabling ellipsometric measurement of structures having micron-scale tilted/ curved surfaces. Generally, it should be noted that ellipsometric measurements provide highly accurate data on complex refractive index of materials and material thicknesses. Accordingly, similar level of accuracy is to be maintained when aiming at increasing spatial resolution of the measurement to maintain industry and scientific standards.

The present invention provides a system for ellipsometry measurements, capable of providing local measurements of micrometric spot size from a sample. Additionally the system of the invention is configured for providing ellipsometry data corresponding to a plurality of angles of incidence. Moreover, according to some embodiments of the invention, the system may be configured for providing simultaneous ellipsometry measurement with a plurality of wavelengths. Thus, the present technique enables plurality of simultaneous ellipsometry measurements with high spatial resolution along surface of a sample. This may be used for increasing measurement accuracy by determining sample parameters in accordance with several at least partially non-correlated measured data pieces, thereby minimizing noise related errors.

In this connection it should be noted that generally there are various methods and system configurations of ellipsometry techniques. The different technique and system configurations generally share similar underlying concept of measuring sample properties based on determining the polarization variations of electromagnetic radiation interacting with a sample at one or more angles. Generally, ellipsometry techniques can be classified according to the way light interacts with the sample including: scattering, transmission and reflection ellipsometry. Typically, reflection ellipsometry is based on determining optical properties of a sample by reflected light off its surface, however various variations of this technique are known, for example:

Null ellipsometry is based on minimizing the intensity of light wave collected by a detector unit. The system generally includes a polarization modulation unit with a retarding element at the input and a polarization analyzer unit at the output, and by selectively controlling the rotation of these components, light intensity is aimed to be minimum at the detector.

Photometric ellipsometry is based on varying one or more conditions while collecting data on reflected light intensity at a detector unit. Photometric ellipsometer systems do not necessarily include a retarding element, but it is preferred for some cases in order to increase accuracy. Photometric ellipsometer systems may be associated with various types, such as rotating analyzer ellipsometer (RAE), rotating polarizer ellipsometer (RPE), rotating compensator ellipsometer (RCE) etc.

Variation of polarization components in photometric ellipsometry systems may be performed in one of two different ways. One is to measure the light intensity at the detector at predetermined fixed azimuthal positions, providing static photometric ellipsometry. Another technique is based on periodically or selectively varying the azimuth angle of at least one of the polarizer, analyzer and compensator along selected time frame, thus providing dynamic photometric ellipsometry. The detected signal may then be Fourier-analyzed in order to determine the ellipsometric parameters $\psi$ and $\Delta$.

The present invention relates to reflection ellipsometry and is described, for simplicity, as operating using general techniques associated with Static Photometric Rotating Analyzer Ellipsometry. Further, the general technique of ellipsometry measurement is provided herein as example only and additional measurement technique, which may be associated with variation of the polarization modulation unit and/or polarization analyzer unit and/or detection unit, may be used with the technique of the present invention.

Further, the technique of the present invention can, and should be read as, be used for data collection and calibration in various types of Fourier plane imaging systems. More specifically, the present technique, on one broad aspect thereof, enables determining both incident angle values and instrumental/system inflicted polarization variations, which may alter measurement of various optical measurement systems, as well as different types of ellipsometry measurement techniques and/or systems.

The ellipsometer system according to the present invention utilizes high numerical aperture objective lens and monochromatic or polychromatic (e.g. white light) illumination for providing angular, and possibly wavelength, resolved ellipsometric data while maintaining a small spot size to thereby enable high resolution ellipsometry, with micrometric measurement spot. Generally, the system utilizes an illumination channel propagating along a first optical axis and a collection channel along a second optical axis where the first and second optical axes are spaced apart and parallel to each other and to a main optical axis of the objective lens. Generally the first and second optical axes are symmetric for reflection about the main optical axis. Alternatively, optical axis of the illumination channel may coincide with optical axis of the objective lens, while a light splitting/deflecting element may be used for intersecting width of the illumination channel for collecting at least portion of returning light along a shifted collection channel.

The illumination channel is configured for providing illumination of the sample through the objective lens. The illumination channel further comprises at least one polarization modulation unit, e.g. linear polarization filter and quarter-wave retarder. Light transmitted through the illumination channel is passed through the linear polarizer and following through the quarter-wave retarder in order to provide selected incident polarization states for the ellipsometric measurement.

Further, the system comprises a collection channel, configured for collection of light returning from the sample. The collection channel generally utilizes the same objective lens for collection of light reflected from the sample and may further comprise at least one light reflection/deflection element such as a mirror (e.g. rectangular or D-shaped mirror) or beamsplitter for diverting collected light with respect to the illumination channel. The collection channel generally also comprises a polarization analyzer filter and a detector array configured to be located at Fourier plane with respect to the surface of the sample. Thus, the detector array is configured to provide Fourier imaging of the surface of the sample, where different pixels of the detector array correspond to light components reflected from the sample at different corresponding angles. Generally, the collection channel may also comprise an optical arrangement including one or more lenses enabling to direct the collected light toward the detector array while satisfying the Fourier condition, i.e. satisfying the condition that the detector array is located at an optical plane corresponding with back focal plane of the objective lens.

Thus, the collection unit, and the corresponding detector array of the ellipsometer system according to some embodiments of the present invention is configured to provide image data pieces corresponding to angular distribution of light reflected from an illuminated spot on surface of the sample. More specifically, each pixel (or a group of pixels)

of the detector array provides data indicative of light reflection with specific angle of reflection, and generally a corresponding angle of incidence. Additionally, in some embodiments of the invention configured for polychromatic ellipsometric measurements, the collection channel may also comprise a spectral separating module (e.g. prism or diffractive element such as grating) providing spectrometric functionality to the collection channel. The spectral separating module is configured for spatially separating light components of different wavelengths toward corresponding different regions/pixels of the detector array. Thus the collected image data detected by the detector array provides data about light components of different wavelengths as well as light components returning from the sample at different angles. Generally, the collection channel is configured for collecting light returning from the sample and directing it to the detector array to thereby provide output image data in a form of an array of pixels where one selected axis (e.g. rows) corresponds to variation of angles of reflection/incidence and another selected axis (e.g. columns) corresponds to variation of wavelengths.

Generally, as indicated above, the at least one light reflection/deflection element may be a D-shaped mirror element or beamsplitter. In some embodiments the use of a D-shaped mirror may be preferred over a beamsplitter. This is as the higher reflected light intensity component provided by a D-shaped mirror when compared to a beamsplitter, which is transmitted to the selected direction enables to increase signal intensity and thus signal-to-noise ratio. As indicated above, accuracy is a key feature of ellipsometry and thus increasing of signal intensity is generally preferred. A beamsplitter may introduce losses and interference effects to the system by adding interfaces for reflection and transmission both in the illumination path and collection path, resulting in data disturbing effects. This is while, a D-shaped mirror introduces a single reflection interface at the collection path without interfering with the illumination path.

Generally, to provide complete ellipsometry measurements, several optical measurements are taken, with selected variations of polarization of light illuminating the sample and polarizations of the collected light. Accordingly, the polarization modulation unit of the illumination channel and the polarization analyzer unit of the collection channel, typically include components configured to be selectively rotatable about a selected axis, parallel to path of light propagation through the channel. For example, rotation of the linear polarizer and/or quarter-wave retarder of the polarization modulation unit is used for varying polarization state of light impinging on the sample, similarly, rotation of the polarization analyzer enables detection of corresponding polarization components of reflected light. Each measurement, of different polarization illumination/collection, provides image data corresponding to reflection intensity for a plurality of angles and plurality of wavelengths. For example, four measurements of corresponding selected polarization states may be taken for each spot, the measurements differ in orientation of the linear polarization analyzer (defined herein by $\alpha$) and phase delay between p (parallel polarization component with respect to plane of light impinging and reflected from the sample, or plane known as the plane of incidence) and s (perpendicular polarization component with respect to the so-defined plane) components of incident light (defined herein by $\beta$), providing data maps indicating intensity of reflected light for different polarization states, $I(\alpha, \beta)$.

From the four measurements, for each angle of incidence and each wavelength a ratio $\rho = \tan(\psi) \exp(i\Delta)$ is determined, providing local ellipsometric data of the illuminated spot of the sample.

Generally, the above described ellipsometry system provides output data in the form of intensity maps associated with reflection components of light impinging on to the measurement spot on the sample with different angles of incidence and reflection with respect to sample surface. To provide full processing of the output data and determine properties of the sample, each data point is to be associated with a corresponding angle of incidence, and possibly wavelength of light. Accordingly, the present invention also provides a technique enabling calibration of the ellipsometer system for determining angular variation of collected data at high accuracy. To this end, the ellipsometer system of the present invention may comprise, or be associated with, a control unit comprising a processing utility and memory utility. The control unit may be configured for selectively operating in accordance with suitable input data, for determining calibration map indicative of angular variation of light components incident on the sample, and at times of wavelengths, and corresponding pixels within the detected intensity map.

Generally, the calibration technique is based on providing reference ellipsometry data associated with one or more reference samples (generally at least two reference samples) having known ellipsometric parameters $\psi_{ref}$ and $\Delta_{ref}$. The ellipsometric data of the reference sample may be measured by any ellipsometric technique for any selected angle of incidence using known conventional techniques.

Further, the technique comprises measuring the one or more reference samples using the ellipsometer system providing angular and wavelength resolved ellipsometry HSRE) system. These measurements provide data sets in which the different data points are to be assigned with corresponding angles of incidence. Generally, from the measured data set, experimentally obtained ellipsometric parameters including $\psi_{exp}(y_F)$ and $\Delta_{exp}(y_F)$ are determined. These parameters are determined with respect to selected rows of the collected data $y_F$ associated with certain angles that are to be determined experimentally. This assigns angular data to different rows of the detected data, enabling to identify ellipsometric parameters of any selected sample with multiple angles of incidence and wavelengths.

The calibration technique according to some embodiments of the present invention, is based on the inventors' understanding that the polarization relations between light components affected by the system can be separable with respect to the corresponding effects caused by the sample. Generally, a non-birefringent optical system can be considered in accordance with certain relation between polarization variations caused by the measured sample and those introduced by the system, such that the ellipsometric parameters $\psi$ and $\Delta$ can be expressed as:

$$\psi_{exp}(\phi) = \tan^{-1}(\tan(\psi_{system}(\phi)) \cdot \tan(\psi_{ref}(\phi)))$$

$$\Delta_{exp}(\phi) = \Delta_{system}(\phi) + \Delta_{ref}(\phi) \quad \text{(Equation 1)}$$

where the parameters having the subscript "exp" relate to the experimentally obtained un-calibrated ellipsometric data, and $\phi$ relates to the incident angle which is to be determined. To this end, reference data associated with ellipsometry measurement of the one or more reference samples, preferably two reference samples, or pre-provided and stored data in a memory utility, is used for determining the system response in terms of ellipsometric system parameters. Typically, the system response parameters may be determined by:

$$\psi_{system}(\theta) = \tan^{-1}\left(\frac{\tan(\psi_{exp}(y_F))}{\tan(\psi_{ref}(\theta))}\right) \quad \text{(Equation 2)}$$

$$\Delta_{system}(\theta) = \Delta_{exp}(y_F) - \Delta_{ref}(\theta)$$

where $y_F$ relates to row of measured data, that should be calibrated to angle $\phi$; and $\theta$ is any angle that $y_F$ can possibly take. The use of two or more reference samples typically provides sufficient information for determining relation between the rows $y_F$ and the corresponding angle $\phi$ as detected by the ellipsometry system.

The reference data may be provided in the form of complex refractive indices of the reference sample in one or more wavelength, corresponding to one or more wavelengths for which the calibration is provided. More specifically, the ellipsometric system described above may be configured to provide ellipsometric data associated with reflection in a plurality of angles and may further provide ellipsometric data in a plurality of wavelengths. The reference data is generally used for calibration of the angular parameters for one or more wavelength to determine relation between data point (pixels, or rows, on the detector) and corresponding measurement angles. As mentioned above, such reference data may be provided as known complex refractive index data or by measuring the reference samples by standard ellipsometric techniques to determine this data. It should however be noted that such provided reference data might reduce accuracy of the calibration with respect to specifically measured reference data.

Generally, the set of equations in Equation 2 may be solved to assign all values of $y_F$ with corresponding actual experimental angles $\phi$ by determining a comparison between measurements of two or more separate reference samples under the assumption that the system response is independent of the measured sample. Thus, Equation 2 may be solved simultaneously for two or more reference samples to provide data about $\psi_{system}(\theta)$ and $\Delta_{system}(\theta)$, and relation between $y_F$ (row/column number of the detector array) and angle of incidence $\theta$ where the angle $\theta$ covers the range of incident angle values available by the numerical aperture of the objective lens, which is assigned to any $y_F$ in order to determine the actual experimental incident angle value $\phi$ corresponding to that position $y_F$. This is done by comparing the ellipsometric measurements of two different reference samples by the HSRE under the assumption that the system information is independent of the measured sample type. Generally, according to the present invention, the reference data may be provided, e.g. utilizing independent ellipsometric measurement of the reference samples or obtaining corresponding data from a local or remote database, to one or more processors associated with control unit of the ellipsometric system. The one or more processors may be operated in accordance with computer readable codes including instructions on Equation 2 and determine correspondence between incident angle values $\phi$ and row positions $y_F$ on the detector array.

After operation of the calibration, generally by one or more processors associated with a control unit, and assignment of angle data to the different pixels of the detector array, any additional sample may then be measured. The measurement data is provided to the control unit utilizing stored data about angles assigned to each row/pixel to provide measurement data corresponding to different measurement angles. Utilizing the measurement data, the actual sample parameters are extracted based on the system polarization parameters for each angle of incidence to determine $\psi_{sample}(\phi)$ and $\Delta_{sample}(\phi)$, for each angle $\phi$ and possibly for different wavelengths $\lambda$ when polychromatic ellipsometry is used.

The technique and system of the present invention may also provide for ellipsometry of non-flat samples. To this end, a reference location, corresponding to center of spot on the Fourier plane of monochromatic illumination reflected from the surface is marked as reference inclination of the sample. As the system is configured to provide Fourier imaging of the spot illuminating the sample, variation in angle of the surface of the sample provides corresponding shift in location of the light spot on the Fourier plane as detected on the detector array. In this connection, the system may periodically operate in tilt detection mode utilizing monochromatic illumination having beam diameter that is smaller than aperture of the lens unit enabling monitoring of the center of spot with respect to the reference location. In some other configurations the system may periodically or selectively apply suitable image processing techniques for determining location of collected data associated with one or more selected wavelength of the polychromatic illumination and determine spot position in accordance with position of light components of the corresponding wavelength. Upon detection of shift in central spot location, angle of tilt is determined in accordance with magnitude and direction of the shift. In some configurations, the sample may be tilted accordingly so that the currently illuminated spot is in normal orientation with respect to the illumination optical axis. In some other embodiments, the system may operate to determine a direction of the tilt, and rotate the sample to align the tilt direction such that shift of the central spot location is parallel with direction of increase of angle in the measured data on the detector array. Generally, variation of spot location along axis that is parallel with respect to variation of angles of incidence on the detector array corresponds to shift in angle calibration. Accordingly, with known magnitude of parallel tilt, applying suitable shift between data points on the detector array and their assigned angle of light incidence provides tilt correction and enables detection of ellipsometric data.

Generally, upon detection of angular tilt of a sample, the present technique may utilize the so-detected angular tilt and further generate data map providing topological surface mapping of the sample. To this end, for each scan position on the sample surface, a tilt vector indicating magnitude and direction of the surface tilt is generated and stored in a memory unit. After complete scan of the sample surface the tilt data pieces are processed to generate a map (being two- or three-dimensional) describing surface structure of the sample.

It should also be noted, and is described further below, that the present technique and system may also be used as optical module configured to be mounted on an optical microscope, e.g. utilizing the microscope lens arrangement as lens unit of the ellipsometry system. These configurations allow addition of ellipsometry functionality to conventional optical microscopes.

Thus the present invention provides a system for use in ellipsometric measurement, the system comprising an illumination channel configured to provide substantially collimated optical illumination having selected polarization state propagating along a first optical axis, a lens unit having high numerical aperture and a main optical axis, being parallel and spaced apart from the first optical axis, the lens unit is configured for focusing light components propagating along the first optical axis onto a predefined sample plane where a sample is located. The system further comprises a collection module configured for collecting light components reflected from the sample plane and directed through the lens unit along a second optical axis, being parallel and spaced apart from the first and main optical axes, and for directing the collected light onto a detector array located at an optical plane corresponding with Fourier plane with respect to the sample plane. The collection module may also comprise a spectrograph module (e.g. prism or diffractive element such as grating) configured for spatially separating light components of different wavelengths to thereby direct light components of said different wavelength to corresponding pixels of the detector array.

Generally according to the present invention, the system may also include a control unit configured for receiving image data pieces from the detector array and processing the collected data in accordance with pre-stored system reference data to determine ellipsometry data about a sample. Additionally, the control unit may include a surface alignment module, the surface alignment module is configured and operable for determining a center of spot of light components of a selected wavelength as detected on the detector array, and compare said determined of spot to a reference spot location corresponding to a level alignment of the sample surface. In some embodiments, the surface alignment module may also be connected to a sample holder and configured to vary orientation of the sample in accordance with determined variation of the center of spot of collected light with respect to said reference spot location. Generally the sample holder may be configured for scanning a sample surface to provide spatial ellipsometry measurements of a sample, while enabling detection of variation in surface alignment and corresponding tilting of the sample surface to thereby optimize measurement accuracy.

Further, the technique of the present application may also provide for a microscope attachment module configured to enable ellipsometric measurement capability to any microscope unit having a lens (e.g. an objective lens). The attachment module comprises an illumination module and collection module configured providing illumination and for collecting light returning from the sample along corresponding optical axes, which coincide at the objective lens to be parallel and shifted with respect to optical axis of the objective lens.

The illumination unit may comprise a light source unit configured to provide illumination of one or more selected wavelength ranges and selected polarization, the collection unit may comprise a polarization analyzer, and a detector array. The polarization analyzer is configured to transmit collected light of selected polarization orientation to be collected by the detector array. The detector is located at an optical plane being a Fourier conjugated plane with respect to the objective lens, to thereby provide data about angular variation of light reflected from the sample.

The attachment module may also comprise, or be associated with, a control unit configured to operate the attachment module for proper calibration when needed, and for storing calibration data to thereby enable collecting of ellipsometry data of a sample.

Thus, according to one broad aspect, the present invention provides a system for use in optical monitoring of a sample, the system comprising:

- a light source unit configured for providing substantially collimated optical illumination of a selected wavelength range propagating along a first optical axis;
- polarization modulation unit located in optical path of light propagating along said first optical axis and configured for selectively varying polarization of light passing therethrough;
- a lens unit located in optical path along said first optical axis and configured for focusing light onto an illumination spot on a surface of the sample located on a dedicated sample holder, and for collection of light components returning from said surface of the sample;
- a light collection unit configured for collecting light returning from the sample and comprising a polarization analyzer unit and at least one detection unit configured for generating output image data associated with Fourier plane imaging with respect to surface of the sample; and
- a control unit comprising at least one processor utility and a memory utility, said memory utility comprises data indicative of system calibration data, the control unit is configured for receiving data from the detector array and for processing said data in accordance with said system calibration data for assigning data on incident angle of light components with corresponding data points of the output image data.

According to some embodiments, the first optical axis is shifted laterally with respect to optical axis of the lens unit, light components returning from surface of the sample being collected to propagate along a second optical axis spaced apart from said first optical axis at vicinity of the lens unit.

According to some embodiments, the light source unit may be configured to provide optical illumination having ring shaped cross section on the Fourier plane with respect to the sample. The optical illumination may be configured with a pattern providing ring shaped cross section at the Fourier plane of the lens unit.

According to some embodiments, the polarization modulation unit may comprise at least one linear polarizer, said at least one linear polarizer is rotatable about general axis defined by direction of propagation of light therethrough, thereby enabling variation of polarization direction.

The polarization modulation unit may comprise at least one linear polarizer and at least one quarter-wave retarder, said at least one quarter-wave retarder being rotatable to be selectively aligned with respect to the linear polarizer to vary polarization state of the illumination enabling selection of linear and circular polarization states.

According to some embodiments, the light collection unit may comprises an optical imaging module configured for imaging the Fourier plane onto said detector array.

According to some embodiments, the light source unit may be configured for providing polychromatic illumination having a selected wavelength range and composition, said collection unit comprises a spectrograph unit configured for spatially separating wavelengths of light collected from the sample thereby providing output data comprising wavelength resolved ellipsometric data. The collection unit may be configured to provide output image data being in the form of intensity map of light collected with respect to a plurality of incidence angles and a plurality of wavelengths.

According to some embodiments, the light source comprises a monochromatic laser light source, said control unit comprises surface alignment module configured for periodically processing image data generated by the detection unit in accordance with monochromatic illumination, and for determining shift of detected light spot in the image data;

upon detection of shift of location of said light spot, said tilt detection module generates output command for correcting detected tilt of the sample. The surface alignment module may be further configured for recording data indicative of determined tilt angle for one or more measurement locations of the sample, thereby generating surface structure map of the sample.

The system may further comprise a sample holder unit configured for providing sample platform located in optical path of light directed by said lens unit, said sample holder unit being configured for selectively applying sample alignment to the sample in accordance with corresponding command provided by the control unit.

The sample alignment module may comprise at least one of sample rotation and tilt correction.

According to some embodiments, the control unit may further comprise a calibration module configured for selectively carry out calibration of collected angular data of said image data.

The calibration module may be configured for:

retrieving reference data about at least two reference sample, said reference data being indicative of complex refractive index of the reference samples;

generating system command requesting for collection of ellipsometry data of said at least two reference samples using the system;

processing generated image data pieces corresponding with said at least two reference samples in accordance with said reference data, said processing comprises simultaneously determining for each measurement point corresponding to an incident angle, data about the system polarization interfering parameters and value of angle of incidence in accordance with corresponding parameters of the reference sample, to thereby generate calibration data, and storing said generated calibration data in the memory utility.

According to one other broad aspect, the present invention provides a method for use in calibrating of ellipsometry system, the method comprising:

providing reference data on at least two reference samples, said data being indicative of complex refractive index of the reference samples;

collecting ellipsometry data for a plurality of angular directions of said at least two reference samples using said ellipsometry system, thereby generating output data having a plurality of data pieces, each associated with unknown angular direction;

for each data piece corresponding to an unknown angular direction, determining simultaneously system parameters and angle of incidence in accordance with corresponding parameters of the reference data to thereby determine calibration data.

According to some embodiments, the reference data on said at least two reference samples may be indicative on ellipsometric reflection ($\psi$) and phase shift ($\Delta$) parameters of the at least two sample for a plurality of wavelengths corresponding to wavelength range of the ellipsometry system.

According to some embodiments, the reference data on said at least two reference samples may comprise data on complex refractive index of the reference samples, said method comprises determining corresponding ellipsometric reflection ($\psi$) and phase shift ($\Delta$) parameters of the at least two sample for a plurality of wavelengths corresponding to wavelength range of the ellipsometry system based on said data on complex refractive index of the reference samples.

According to some embodiments, said providing said reference data on said at least two reference sample may comprise determining ellipsometric data of the at least two reference samples for a plurality of angles of incidence within a selected predetermined range.

According to some embodiments, the system parameters and angles of incidence are determined to be irrespective of reference sample properties.

According to some embodiments, the method may further comprise assigning one or more candidate angles of incidence for each unknown angular direction of the measured data, and processing said measured data in accordance with said reference, for determining at least one corresponding value of system parameter, said determining simultaneously system parameters and angle of incidence comprises determining minimal variation between said at least one value of the system parameter between at least two reference samples data, thereby determining system parameters and angle of incidence for each data row simultaneously.

According to yet another broad aspect of the invention, there is provided a method for use in ellipsometric measurement, the method comprising providing collimated illumination onto a sample; determining reference detection pixel, of a detector array located at an optical plane corresponding to Fourier plane with respect to the sample, corresponding to plane sample surface; monitoring relative location of monochromatic light reflection on the detector array and upon move of said location, determining a corresponding tilt of the sample surface in accordance with data about angle calibration.

The method may further comprise tilting of the sample to locally align the surface thereof with respect to optical axis of illumination.

Additionally or alternatively, the method may further comprise determining tilt value of the sample along two orthogonal axis, wherein a vertical tilt being associated with shift of collected spot on the detector array parallel to a selected axis of data collection and horizontal tilt being associated with shift of collected spot along axis perpendicular to said selected axis of data collection, determining angular rotation value for varying said tilt values to include vertical tilt and generating corresponding ellipsometric output data.

According to some embodiments, the method may further comprise determining magnitude of vertical tilt in accordance with sample angular rotation value, and determining corresponding shift in calibration data assigning corrected angles of incidence data to pixel rows of collected data thereby determining required calibration correction corresponding to local vertical tilt of sample.

According to some embodiments, the method may further comprise determining tilt angle and magnitude and recording tilt data of the sample.

According to yet another broad aspect, the present invention provides an optical module configured as microscope attachment for providing ellipsometry measurement of a sample, the module comprises: and illumination channel connectable to a light source and comprising at least a polarization modulation unit, and a collection channel comprising a detector array and a polarization analyzer unit; the illumination channel is configured to provide collimated illumination directed along a first general optical axis at an objective lens of the microscope such that said first optical axis is parallel with respect to main optical axis of the objective lens; the collection channel is configured for collecting light from said objective lens along a second general optical axis being parallel to said main optical axis, transmitting said collected light through said polarization analyzer unit and collecting said light on the detector array being located at a Fourier conjugate optical plane with respect to sample being inspected, thereby providing image data associated with high spatial resolution ellipsometry measurement.

According to some embodiments, the optical module may further comprise a control unit comprising at least one processor utility and a memory utility, said memory utility comprises data indicative of system calibration data, the control unit is configured for receiving data from the detector array and for processing said data in accordance with said system calibration data for assigning data on incident angle of light components with corresponding data points of the output image data.

According to some embodiments, the control unit further comprises an angle calibration module configured for selectively carry out calibration of collected angular data of said image data.

The angle calibration module may be configured for:

retrieving reference data about at least two reference sample, said reference data being indicative of complex refractive index of the reference samples;

generating system command requesting for collection of ellipsometry data of said at least two reference samples using the system;

processing generated image data pieces corresponding with said at least two reference samples in accordance with said reference data, said processing comprises simultaneously determining for each measurement point corresponding to an incident angle, system parameters and corresponding angle of incidence in accordance with corresponding parameters of the reference sample to thereby generate calibration data, and storing said generated calibration data in the memory utility.

According to some embodiments, the light source unit is configured for providing polychromatic illumination having a selected wavelength range and composition, said collection unit comprises a spectrograph unit configured for spatially separating wavelengths of light collected from the sample thereby providing output data comprising wavelength resolved ellipsometric data.

The present invention also provide, according to yet another broad aspect thereof, a software product embedded in a computer readable medium and comprising computer readable instructions which, when executed by a computer, cause the computer to:

obtaining reference data on at least two reference samples from one or more selected data sources, said data being indicative of complex refractive index of the reference samples;

generating operation instructions for operating an optical ellipsometry measurement system providing ellipsometric data for a plurality of angular direction of said at least two reference samples, and receive input data having a plurality of data rows, each associated with unknown angular position;

processing the input data in accordance with said reference data for determining calibration data for said optical ellipsometry system, said processing comprising: for each data row corresponding to an unknown angular position, determining simultaneously system parameters and corresponding angle of incidence in accordance with corresponding parameters of the reference sample to determine calibration data.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 20A shows experimentally measured ellipsometric parameters and the relevant fitted model for a sample of bulk silicon with a thin layer of native oxide on top, and FIG. 20B shows thickness mapping of the oxide layer;

FIG. 21 shows sample structure for exemplary measurements;

FIGS. 22A and 22B show experimental scanning results of a region of the sample of FIG. 21;

DETAILED DESCRIPTION OF EMBODIMENTS

Figure 1A:
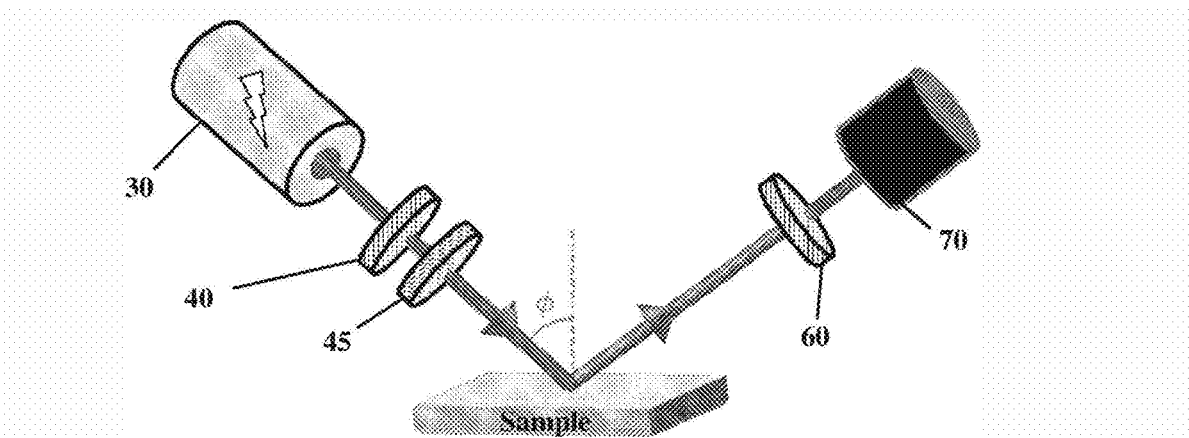
FIGS. 1A and 1B illustrate configuration of ellipsometry systems according to the general art (FIG. 1A) and according to the present invention (FIG. 1B)
Figure 1B:
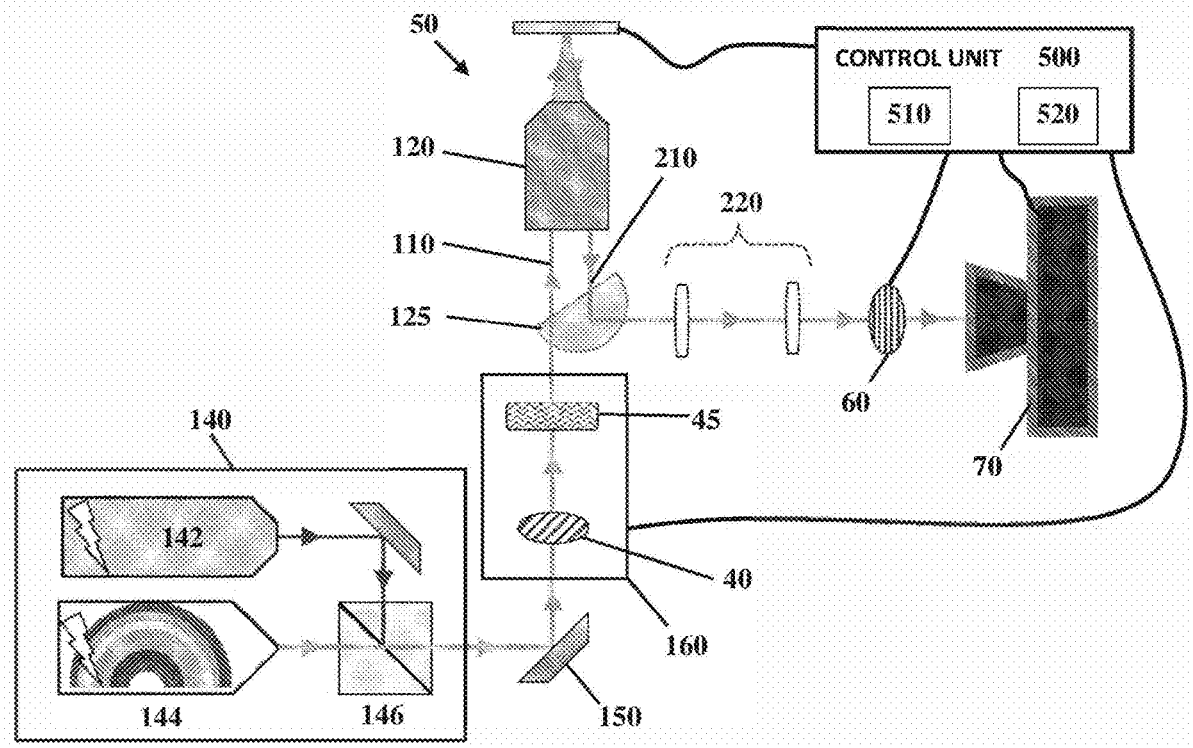

Reference is made to FIGS. 1A and 1B illustrating the principles of ellipsometry measurements. FIG. 1A shows a general conventional configuration for ellipsometry measurements and FIG. 1B shows a system 50 for high spatial resolution ellipsometry capable of providing ellipsometric measured data using a plurality and angles of incidence and plurality of wavelengths.

As shown in FIG. 1A, the general conventional ellipsometry configuration utilizing light source 30, provide illumination onto a sample at selected angle ϕ, polarization state of the light is selected by a polarizer 40 and retarder, e.g. quarter-wave retarder, 45. Light reflects from the sample and is measured by a detector 70, where selected polarization components are filtered using polarization analyzer 60.

The system 50 according to some embodiments of the present invention is exemplified in FIG. 1B. The system 50 utilizes a high numerical aperture (e.g. objective) lens 120 and may utilize shifted axes for illumination 110 and collection 210 channels/paths to illuminate a spot having a micrometric dimension. The light impinging on the illuminated spot arrives from a plurality of angles of incidence and is collected with corresponding plurality of angles of reflection for providing ellipsometric measured data.

As shown in FIG. 1B, the system 50 includes a light source unit 140, configured to provide illumination of one or more selected wavelength ranges. The light source unit is exemplified herein as including monochromatic 142 and polychromatic 144 light sources, and a beam combiner (e.g. beamsplitter) 146. Light provided by the light source unit 140 may be directed onto an illumination path using reflecting element (e.g. mirror) 150. The illumination path typically includes a polarization modulation unit 160 configured for applying selected polarization filtering and rotation to light passing therethrough to provide selected polarization state of light impinging on the sample. In this example, the polarization modulation unit 160 includes a linear polarization filter 40 and a quarter-wave retarder (e.g. Fresnel rhomb) 45. Light of the selected polarization state propagates along the illumination path 110 into lens unit 120. The illumination path 110 is typically shifted laterally with respect to optical axis of the lens unit 120.

Lens unit 120 is generally configured as an objective lens having relatively high numerical aperture. This is to provide high angular range in light components impinging of the sample, as well as to provide small illumination spot enabling high resolution inspection of the sample (e.g. by scanning) Light reflected from the sample is collected by the lens unit 120 to propagate along collection path 210. Light components reflected from the sample along collection path 210 are separated from the illumination path utilizing light reflection/deflection element 125, which may typically be a mirror (e.g. D-shaped mirror) or beamsplitter. The collected light components are directed onto detection unit 70, typically including one or more detector arrays. The detection unit 70 may also include a spectrograph element (e.g. grating and/or prism) located in optical path upstream of the detector array. The collection path typically also includes polarization analyzer unit 60 (e.g. polarization filter) and optical arrangement 220 configured for providing imaging condition where the detector array is located at Fourier plane with respect to the dedicated location of the sample, i.e. in accordance with location of a sample holder platform. Generally, the system includes a collection channel configured to provide Fourier imaging with or without wavelength sensitivity, of selected one or more polarization orientations of reflected light.

Generally, the illumination path 110 may be aligned to be lateral to optical axis of the lens 120. Accordingly, the collection path 210, due to properties of light reflection, may be shifted laterally with respect to the optical axis of the lens unit 120, thereby being spaced apart from the illumination path 110. This shift allows separation of the illumination and collection paths (110 and 210) using a D-shaped mirror, instead of beamsplitter. As is described in more details below, the use of spatial separation between illumination 110 and collection 210 paths enables increased signal-to-noise ratio and thus contributes to accuracy of sample characterization. However, as indicated above, light reflection/deflection element 125 may also be a beamsplitter unit as the case may be. In some embodiments, the system 50 typically also includes a spatial optical filter (e.g. slit mask, not specifically shown) located along optical propagation in the collection path 210 toward the detection system 70, or as part of the detection system 70. The spatial optical filter is configured for partially blocking light components to thereby direct a relatively linear data line to the detection unit 70. In some embodiments, the detection unit 70 includes a spectral separating module (e.g. prism and/or grating, not specifically shown here) configured for directing light components of different wavelengths at corresponding angular directions. The detection unit 70 is typically configured, using the spatial optical filter and the spectral separating module for generating image data in the form of a two-dimensional intensity map, where one axis represent changes in angular orientation of reflected light components and the orthogonal axis represents wavelength as described in more details below.

It should be noted that in some embodiments, the light source unit 140 may be configured to provide laser or polychromatic illumination providing ring shaped cross section on the Fourier plane. Such ring shaped cross section includes greater intensity at periphery thereof, thereby providing high intensity of light to regions associated with large incident angles. This enables additional sensitivity and faster measurement rates to the system while reducing intensity directed to smaller and zero angles of incidence that provides no or limited data on the sample.

Generally, multi angle sample characterization (ellipsometry) systems as exemplified in FIG. 1B may require certain calibration to provide high accuracy measurements as required in the art. To this end the system of the present invention is connectable to a control unit 500 including one or more processors and storage utility that are configured for performing calibration of the angular variation of collected data and for storing calibration data to thereby calibrate any collected data accordingly. Generally, any variation in optical configuration of the system may require additional calibration. To this end the control unit 500 is typically configured and operable for receiving reference data associated with two or more reference samples, receiving collected measurements from of the two or more reference samples and determine calibration data of angular variation by processing the collected measured data in accordance with the reference data as explained further below.

As indicated above, the control unit 500 typically includes one or more processors and a storage utility. Generally, the control unit 500, or the one or more processors thereof may also include additional software and/or hardware modules configured for performing selected tasks. In some embodiments, the control unit 500 may include a sample alignment module configured for determining variations in sample surface alignment and align the sample or collecting mapping of measured data associated with the sample, as described further below. The control unit 500 may also include a calibration module 510 and surface alignment module 520.

The measurement technique of the system of the invention typically utilizes imaging the Fourier plane. The backbone of Fourier plane imaging ellipsometry measurements, which also is its major difference from standard ellipsometry, may be provided by the lens unit 120, generally selected as high numerical aperture (NA) objective lens to incident the light on the sample. Proper selection of the lens unit 120 enables spot size of the incident light to be at a significantly reduced size with respect to conventional ellipsometry techniques. This provides high spatial resolution ellipsometry of selected samples as different points of the sample can be measured separately at micrometric resolution. Lens unit 120 (e.g. objective lens) used to incident the light onto the sample may also bring the advantage of recording multiple incident angle information in a single shot measurement. Rays that leave the sample with the same angle cross at the objective Fourier plane, allowing for recording of angular intensity information. The Fourier plane may be positioned in the vicinity of the lens unit 120 entrance pupil when high NA objective lens is used. Thus, in order to image the objective Fourier plane and obtain spectrally resolved intensities for multiple incident angles, a Fourier plane imaging lens system 220 may preferably be used together with a spectrograph and a detector array, as shown in FIG. 1B. The detection unit 70 is configured to record spectrally and angularly resolved intensities of the light reflected off the sample, which is fundamentally the information required for ellipsometric analysis.

Figure 2:
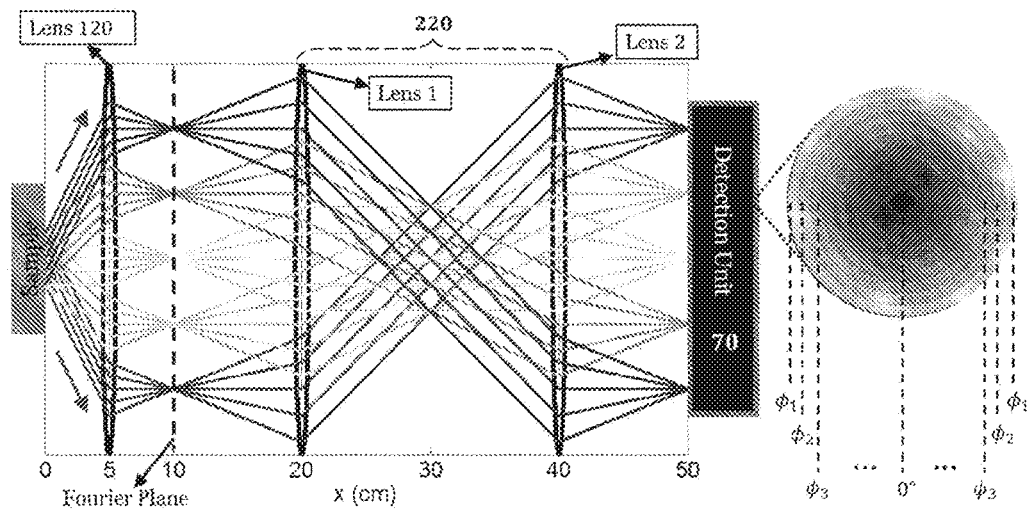
FIG. 2 illustrates some concepts of Fourier plane imaging.

A schematic illustration of Fourier plane imaging principle is illustrated in FIG. 2, showing collection of light from the sample such that light components reflected from the sample with certain (common) angular direction coincide at the Fourier plane corresponding with detection plane (by detector unit 70). In this example lens unit 120 provides Fourier image of the sample surface, and lenses 1 and 2 corresponding to optical system 220 provide relay optical transmitting the Fourier image toward the detection unit, and may provide certain magnification. The resulting image data can generally be represented as a series of concentric rings, or portions thereof. Each concentric ring of the Fourier plane is the intensity values for a specific incident angle value $\phi_1$, $\phi_2$, $\phi_3$, starting from zero degree at the center and progressively increasing until the maximum angle value (depending on the NA of the objective lens) at the outermost circle. Typically, when the illumination path 110 and the collection path 210 are shifted laterally with respect to the optical axis of lens unit 120, only portions of the circles are formed on the detection unit 70. As indicated above, in some configurations, the system of the invention may utilize a D-shaped mirror when imaging the Fourier plane, as well as may use a spatial optical filter, where only selected regions of the circles are collected in the detection data. In this example, the top/bottom region (typically half or less) of the intensity map circles are imaged on the detector array. This partial imaging does not cause any loss of information as the Fourier plane is symmetric around its horizontal diameter. Moreover, in some embodiments, e.g. where a beamsplitter is used and the illumination path 110 is aligned with the optical axis of the lens unit 120, the incident light components may fill the objective entrance pupil, and the reflected light forms a complete circle. As indicated above, the use of D-shaped mirror for light deflecting unit 125 instead of a conventional beamsplitter is typically preferred for improving the signal intensity by eliminating beamsplitter transmission and reflection losses. The use of D-shaped mirror may also improve the signal quality by eliminating the interference effects that might be a caused by multiple interfaces of a conventional beamsplitter.

Figure 3:
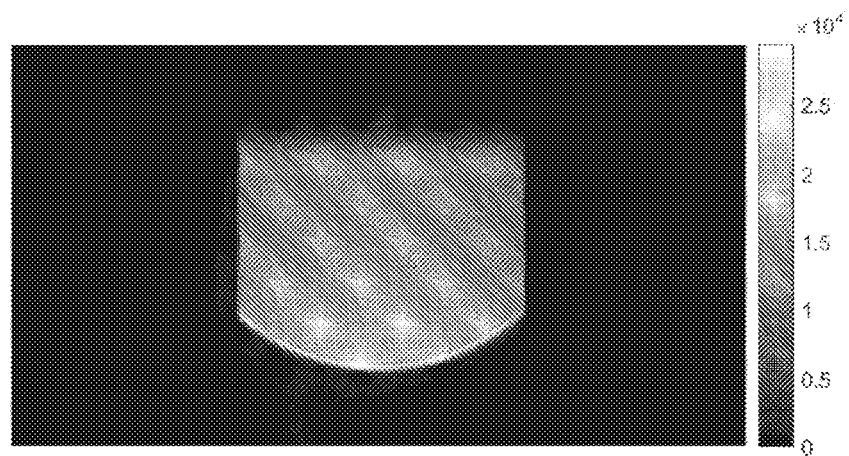
FIG. 3 shows an example of measurement data (zero-order Fourier plane image on detector array when sample is illuminated by white light) provided by a system according to the present invention where the color bar indicates intensity (counts)
Figure 4A:
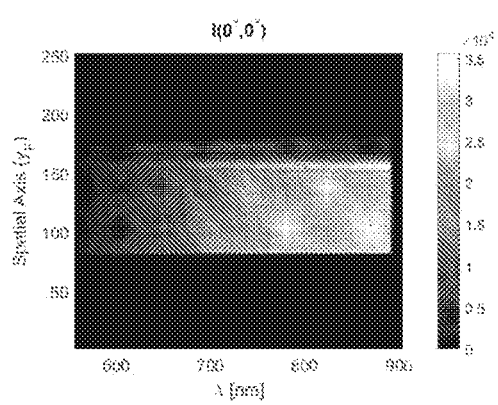
FIGS. 4A to 4D show exemplary measurements for different polarizations of input light and of collected light where the color bar indicates intensity (counts)
Figure 4B:
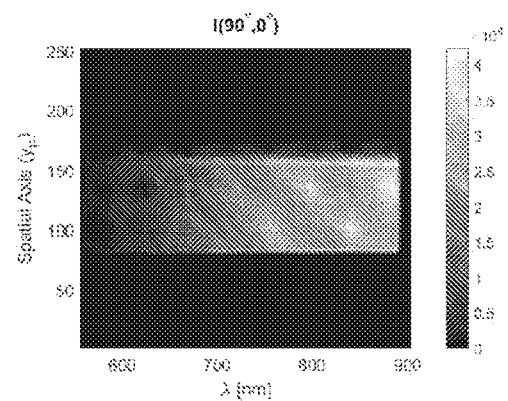
Figure 4C:
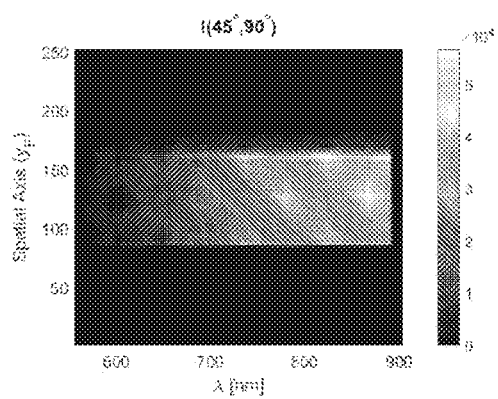
Figure 4D:
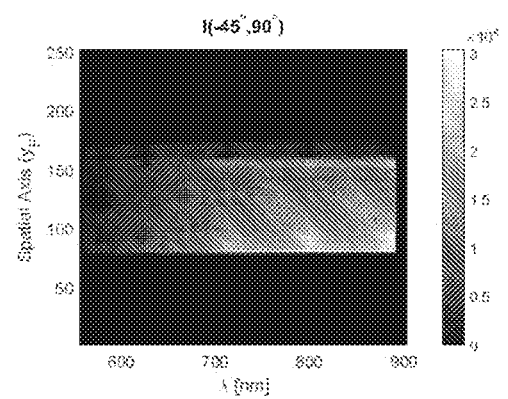

Reference is made to FIG. 3, exemplifying experimental zero-order image collected by system 50 configured as described herein. The collected data corresponds with intensity map providing zero-order Fourier plane imaging of a sample illuminated with white (polychromatic) illumination, while without the use of spectral separating module.

Collected data associated with angular and wavelength resolved ellipsometry is exemplified in FIGS. 4A to 4D. FIGS. 4A to 4D show intensity map associated with inspection of a gold plate at wavelengths between around 600 nm and 900 nm for different polarization states of the polarization modulation unit 160 and polarization analyzer unit 60. The spatial axis ($y_F$) corresponds to different row numbers of the detector array. FIG. 4A to 4D show the collected data in four different polarization settings corresponding with $I(\alpha, \beta)$, indicating the recorded intensity when the linear analyzer 60 is at angle $\alpha$ (with respect to the plane of incidence) and the polarization modulation unit 160 introduces a phase delay of $\beta$ between p and s polarization components of the incident light (when $\beta=0°$ linearly polarized light is incident and when $\beta=90°$ circularly polarized light is incident on the sample). The color bar in the figures indicates measured intensity (in counts).

To provide spectrally resolved light intensities needed for ellipsometric analysis, the detection unit typically includes a spectral separating module (also referred to herein as spectrograph). The spectral separating module typically includes a spatial filtering mask (e.g. in the form of a slit) providing narrow line of light components on the cross section of collection path. Generally, width of the spatial filtering mask is sufficiently narrow allowing the spectral separation unit to provide selected spectral resolution at selected wavelength range. The four different measurements having different system settings required for ellipsometric measurement of a bulk gold sample are shown in FIG. 4.

Figure 5:
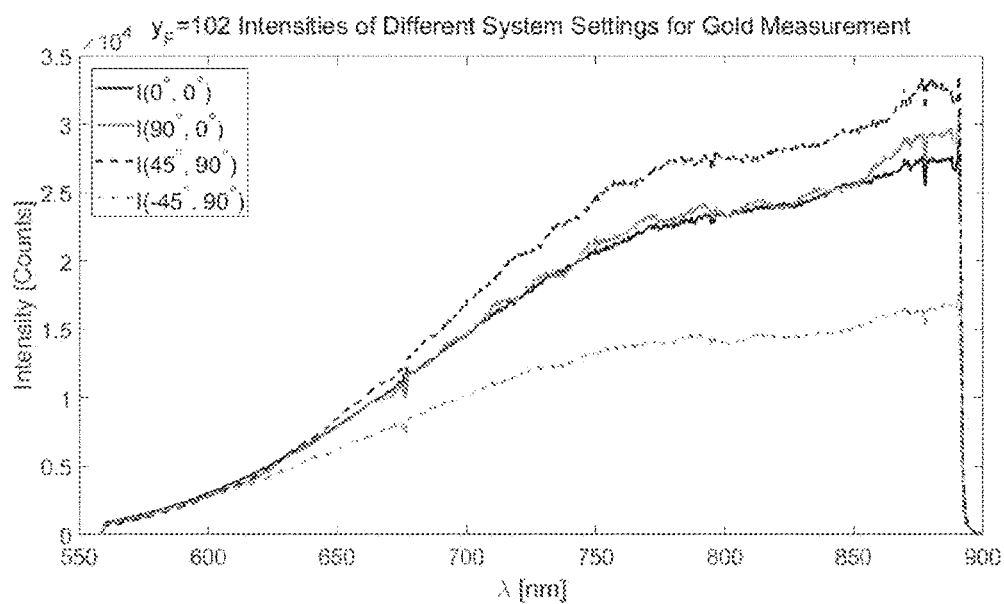
FIG. 5 exemplifies intensity profile measured for selected arbitrary angle for several wavelengths.

Although assigning columns of the collected data with corresponding wavelengths is relatively straight forward, assigning of the angles with the corresponding rows ($y_F$) is on one hand of great importance for ellipsometric analysis as it represents the incident angles of light on the sample, and on the other hand is more complex. Generally, the range of incidence angles is determined by width of the light beam in the illumination path 110, lateral shift of the illumination path with respect to the optical axis of the lens unit 120, and numerical aperture of the lens unit 120. Accordingly, each single-pixel horizontal line of the image is a spectrally resolved intensity profile corresponding to a specific incident angle that needs to be identified. Generally, such each horizontal line, corresponding to a single angle of FIGS. 4A to 4D, corresponds to complete polychromatic ellipsometric measurement. A graph for the four intensity profiles of an arbitrary pixel representing a certain angle of incidence is shown in FIG. 5.

Generally, the angularly and spectrally resolved intensity values of the selected four different system settings as illustrated in FIGS. 4A to 4D provide all the information needed for ellipsometric analysis of a sample. However, the reduced spot size (high spatial resolution) and simultaneous recording of multiple incident angles require the need for calibration, assigning angles with the relevant rows of the collected data. Moreover, the use of additional optical elements along the optical path of illumination path and collection path, when compared with conventional ellipsometry, may result in additional light polarization variations associated with light interaction with the optical elements. Such additional light polarization variation is independent of the desired polarization changes associated with light interaction while reflecting off the sample. Additionally, as the state of the art ellipsometry measurements are very sensitive to incident angle values, to provide comparable output, assigning incident angle values to rows of the collected data on the Fourier plane in the system according to the present invention, should preferably be accomplished with high accuracy. Hence, there are two sets of unknowns that need to be determined: the incident angle values on the imaged Fourier plane and parameters associated with the system interference with polarization states of light passing therethrough. Generally, the interference of the system affecting polarization state of light passing therethrough may also vary for different incident angles as the path of light components and the regions of interactions vary with optical path of light components.

Thus, the present invention also provides a calibration technique, which is relating to the two sets of unknowns and is configured for extracting them simultaneously from ellipsometric information. The technique, as described herein below, may be operated by one or more processors associated with a storage utility and configured for operating the ellipsometric system and receive collected data therefrom. Additionally or alternatively, the required measurement data may be collected and transmitted, via network communication, to a remote processing utility, for providing offline processing and to determine the calibration parameters for the system. The so-determined calibration parameters may then be transmitted to be stored and retrieved for use in various measurements.

Additionally, the monitoring system as described herein may also be capable of providing ellipsometric measurements of micro-tilted/curved surfaces. This is based on micrometric spot size as well as using micro-alignment technique in which tilt of the sample surface is determined and corrected to provide accurate measurements. Generally, conventional standard ellipsometer systems use an aligning light beam for determining orientation of the sample and properly aligning the sample, so that the sample is exactly at the right position and angle for the pre-determined incident angle values to be valid. Generally, appropriate alignment of the sample is a natural requirement for any ellipsometric measurement. More specifically, to obtain accurate ellipsometric information, the measured area is generally laid flat under the objective lens so that the pre-determined incident angle values of the Fourier plane are valid. Monitoring region on a surface of a sample that carries surface structure with micron-scale tilts/curves may typically cause shifts in the incident and reflection angles of the incoming light, in additional to the effect of making the pre-determined angle information of the detector array pixels not valid. These cause the measurement not fit the calibration parameters and hence result in inaccurate measurement. Since micron-scale tilts/curves may include very small surface curvature that may not be detectable for alignment by a direct light beam, the system according to some embodiments of the invention may utilize tilt alignment technique enabling point to point detection and correction of surface tilt of the sample, while being located on dedicated sample holder and under the objective lens unit to provide accurate ellipsometric measurements.

As indicated above, the scanning High Spatial Resolution Ellipsometer (HSRE) according to some embodiments of the present invention (exemplified in FIG. 1B) is based on Fourier plane (or back focal plane) imaging of a high numerical aperture objective lens associated with lens unit 120. Spectral imaging of the Fourier plane may provide spectrally and angularly resolved information of the reflected light off a sample, which is basically the information needed for ellipsometric analysis. Although the concept of Fourier plane imaging ellipsometry has a history of several attempts to function, it was never accomplished to be simple and accurate enough for commercial and wide use because it was lacking the correct calibration method. Generally ellipsometry measurements and corresponding technique are all about reflecting light off a sample with a specific incident angle and measuring the variations in the polarization of the incident light to obtain accurate and useful information about the sample. Therefore it is very sensitive to precise incident angle information. When the light is incident on a sample through lens unit 120 (e.g. objective lens) with multiple incident angles (depending on the numerical aperture of the lens unit), although spectral imaging of the objective Fourier plane supplies the angularly resolved broadband intensity values of the light reflected off the sample, it does not provide sufficiently accurate and sensitive information of the incident angle values. In addition to this lack of highly sensitive information, generally, the optical elements in the optical path may cause additional light polarization variations other than the desired change obtained from the reflection off the sample. Since the optical path of each experimental incident angle might be different, the inflicted polarization variation by the optical system elements may be position and angle dependent. This complex effect may consist a significant disruption to the highly sensitive polarization variation inflicted by the reflection off the measured sample. For the accurate high spatial resolution ellipsometry technique to provide comparable ellipsometric results, these natural challenges of Fourier plane imaging configuration are to be resolved.

To this end, the technique and system of the present invention further provides Angle and Polarization Calibration technique (APC) configured to address and solve two sets of unknowns: the experimental incident angle values on the Fourier plane (angle calibration) and the experimental incident angle dependent ellipsometric system parameters that define additional variation of polarization caused by the optical system elements (polarization calibration). The APC technique relates to these two sets of unknowns and is configured to determine them simultaneously by using ellipsometric information, while generally not requiring any additional, non-ellipsometric, information.

The ellipsometric information for each experimental incident angle is collected on a specific position (generally a horizontal line of single pixel width) in the Fourier plane image on the detector array. This is also the case for polychromatic ellipsometry where horizontal axis of the image data relates to angles of incidence and vertical lines relate to wavelength. For simplicity, certain selected row is referred to herein, $y_F$. The calibration technique is provided to assign an accurate incident angle value $\phi$ to this position $y_F$. Additionally, extra polarization variation typically associated with light interaction with the optical system elements may be represented by the two conventional ellipsometric parameters for each experimental incident angle value ($\psi_{system}(\phi)$, $\Delta_{system}(\phi)$) and may be determined simultaneously with the experimental incident angle values to enable correction of data collected in sample monitoring by the system.

Figure 6:
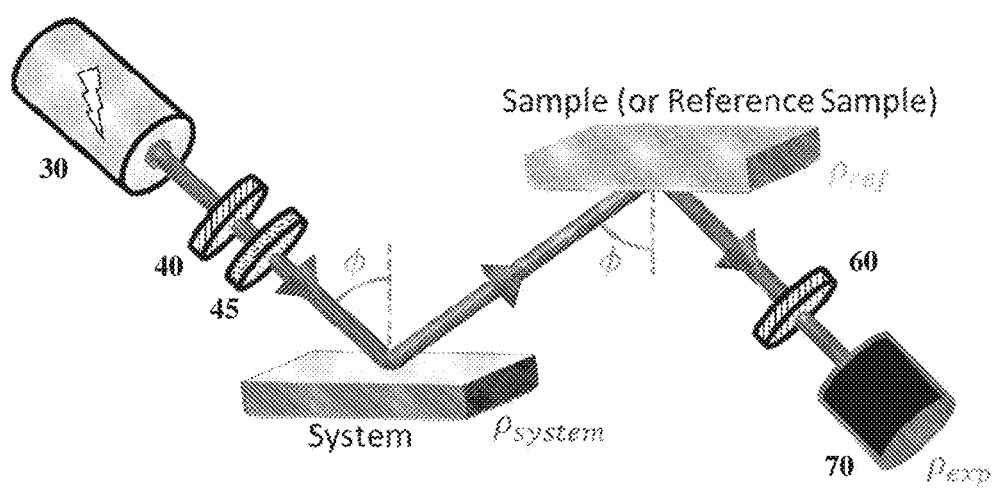
FIG. 6 illustrates two consecutive-reflection ellipsometry system, illustrating the concept of calibration according to some embodiments of the invention.

To this end, the inventors of the present invention have identified that the complex polarization variation effect of optical system elements may be represented in a simplified model providing common important mathematical relations. More specifically, ellipsometry measurements using the HSRE system as described above may be represented as a two-consecutive-sample ellipsometric analysis with a single angle of incidence $\phi$. This is illustrated in FIG. 6, showing a schematic model where polarization variations affected by the system are represented as first reflection form a surface marked as System. The returning light continues to be reflected from the sample and collected by the detection unit 70, after passing through polarization analyzer 60.

Accordingly, the total effect of the optical system elements on the polarization state of light can be represented as a single reflection from an imaginary system material resulting in the collective effect of all the system elements. Generally, configuration of the system with no birefringent elements (other than in the polarization modulation unit 160 which is represented in this model as polarization filter 40 and retarder 45, and polarization analyzer unit 60) enables for the representation of the optical path before and after the sample as one single reflection from an imaginary system material, either before or after the sample.

The imaginary reflection can be represented by ellipsometric system parameters ($\psi_{system}(\phi)$, $\Delta_{system}(\phi)$) enabling correction of data collected from a sample, generally, system reflection and phase shift parameters ($\psi_{system}(\phi)$, $\Delta_{system}(\phi)$) hereby referred herein as system interfering parameters. In order to determine these system parameters, the sample in FIG. 6 is replaced by reference samples with pre-determined, known, ellipsometric parameters ($\psi_{ref}(\phi)$, $\Delta_{ref}(\phi)$). Since the ellipsometric parameters strongly depend on the incident angle, the relevant broadband ellipsometric relations for any given incident angle $\phi$ are given by:

$$\rho_{system}(\phi)=\tan(\psi_{system}(\phi))e^{i\Delta_{system}(\phi)}$$

$$\rho_{ref}(\phi)=\tan(\psi_{ref}(\phi))e^{i\Delta_{ref}(\phi)}$$

$$\rho_{exp}(\phi)=\rho_{system}(\phi)\cdot\rho_{ref}(\phi)=\tan(\psi_{exp}(\phi))e^{i\Delta_{exp}(\phi)} \quad \text{(Equation 3)}$$

where $\rho(\phi)$ is a measure for the change in polarization and the subscript "exp" stands for experimental values prior to calibration correction, as obtained from detector readings. Accordingly, the measured parameters may be represented as:

$$\psi_{exp}(\phi)=\tan^{-1}(\tan(\psi_{system}(\phi))\cdot\tan(\psi_{ref}(\phi)))$$

$$\Delta_{exp}(\phi)=\Delta_{system}(\phi)+\Delta_{ref}(\phi) \quad \text{(Equation 4)}$$

where $\psi_{exp}(\phi)$ and $\Delta_{exp}(\phi)$ are the experimental results from the HSRE system prior to calibration correction, which include the effects of both the sample and the system elements. These values may not carry any useful information of the sample as they are distorted by the reflections and transmissions from optical system elements. $\psi_{ref}(\phi)$ and $\Delta_{ref}(\phi)$ are the actual sample values, which are to be extracted from the HSRE measurement with high accuracy by a proper calibration.

It is important to note that the system parameters only depend on the optical system elements and are independent of the measured sample (in a non-birefringent system). It is obvious that the incident angle values on the Fourier plane are also independent of the sample type. These two sample-independent unknowns are generally related and solved together by the present technique.

Generally, to provide accurate reference data, the technique may utilize actual measured data of at least two different materials, typically using a reliable standard commercial ellipsometer. Alternatively, accurate pre-stored data about the reference samples may be used, or obtained from an existing database. In the following example, the reference samples are selected to be optically thick, pure gold and platinum samples; it should be noted however that other reference samples may be used. The advantage of these noble metals is that they do not get oxidized and hence are simpler for ellipsometric measurement.

The data on the reference samples may be provided as complex refractive indices of the materials and/or their ellipsometric parameters $\psi_{ref}(\theta)$ and $\Delta_{ref}(\phi)$. Generally, ellipsometric parameters may be calculated for any incident angle value $\theta$ in accordance with data on the complex refractive index.

Further, the at least two reference samples are placed on a sampled holder to be measured using the HSRE system of the invention. These measurements provide experimental ellipsometric parameters $\psi_{exp}(y_F)$, $\Delta_{exp}(y_F)$ which are obtained where each row $y_F$ on the Fourier plane representing a yet unknown incident angle value. The experimental ellipsometric parameters also include collective disruption associated with the optical system elements, hence does not provide reliable information about the measured sample without proper correction.

Figure 7A:
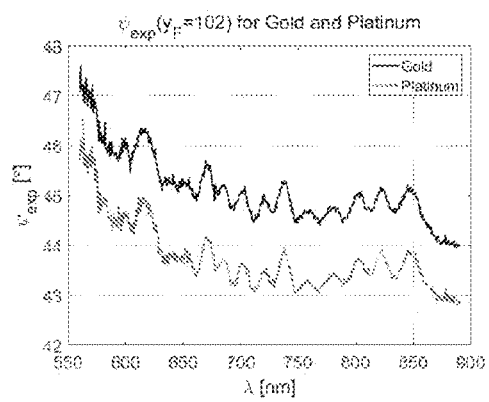
FIGS. 7A and 7B show measured ellipsometry parameters at a selected detector array position for two reference samples, prior to calibration of the angular variation of the measured data.
Figure 7B:
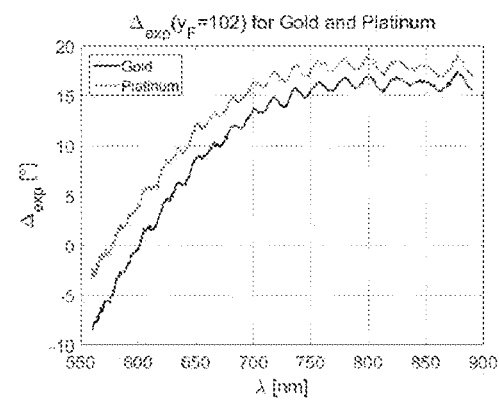

For a clear explanation of the calibration process, the present technique is demonstrated for a single position, e.g. $y_F$=102 on the detector array. The experimental ellipsometric parameters $\psi_{exp}(y_F=102)$, $\Delta_{exp}(y_F=102)$ of this detector array position are shown in FIG. 7 for both gold and platinum reference sample measurements.

For each position $y_F$ on the Fourier plane having experimental ellipsometric parameters $\psi_{exp}(y_F)$ and $\Delta_{exp}(y_F)$, there might be many possible assigned angles. To this end, the technique utilizes determining a plurality of possible candidates relating to system parameters, $\psi_{system}(\theta)$ and $\Delta_{system}(\theta)$ (also defined herein as system interfering parameters). This may be done by assigning plurality of angle values, e.g. angle values available by the numerical aperture of the lens unit, and using the relevant reference parameters $\psi_{ref}(\theta)$ and $\Delta_{ref}(\theta)$ values. The Equations for $\psi_{exp}$ and $\Delta_{exp}$ are rearranged and used for this calculation, as shown in following Equations. This may be done separately for all reference measurements (gold and platinum).

$$\psi_{system}(\theta) = f(\psi_{ref}(\theta), \psi_{exp}(y_F)) = \tan^{-1}\left(\frac{\tan(\psi_{exp}(y_F))}{\tan(\psi_{ref}(\theta))}\right) \quad \text{(Equation 5)}$$

$$\Delta_{system}(\theta) = f(\Delta_{ref}(\theta), \Delta_{exp}(y_F)) = \Delta_{exp}(y_F) - \Delta_{ref}(\theta)$$

Figure 8:
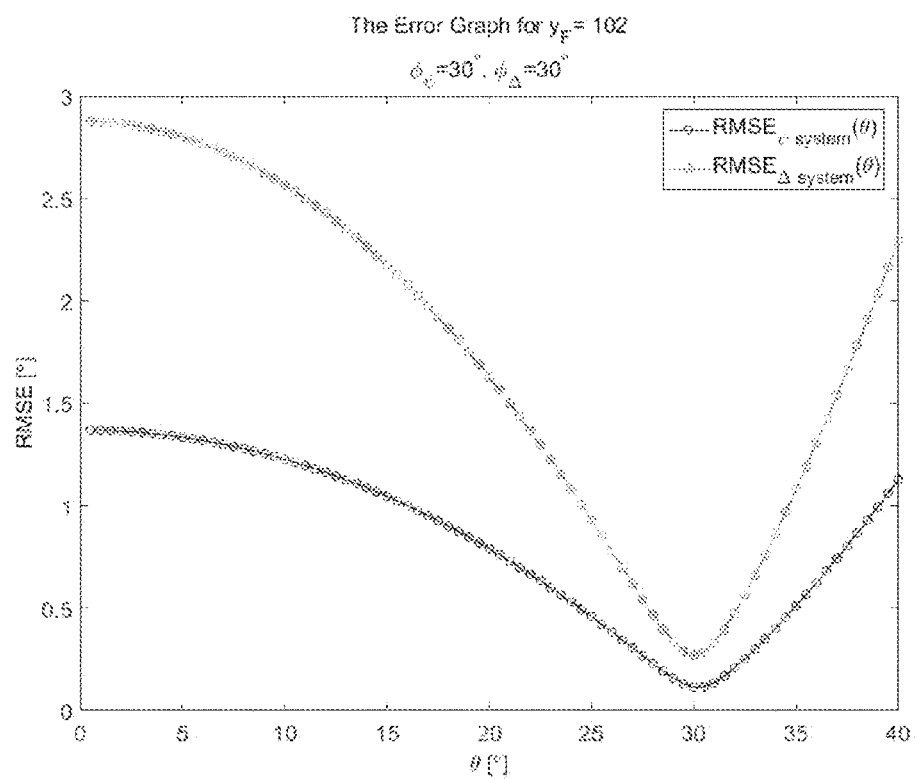
FIG. 8 illustrates error minimization for an angular position on the detector array based on two reference samples according to some embodiments of the invention.

As stated before, the experimental incident angle values $\phi$ and the relevant system interfering parameters $\psi_{system}(\phi)$, $\Delta_{system}(\phi)$ are independent of the measured material type in a non-birefringent system. Accordingly, for each position $y_F$ on the Fourier plane, the ellipsometric system parameters are determined for common angle values (candidates), $\theta$. Then the accordingly calculated $\psi_{system}(\theta)$ and $\Delta_{system}(\theta)$ are compared between the two reference measurements. In order to have a fair comparison, the determined system parameters $\psi_{system}(\theta)$ and $\Delta_{system}(\theta)$ associated with a common angle $\theta$ are compared separately between the two reference measurements. This comparison generally may result in two sets of Root Mean Squared Error (RMSE) arrays for each ellipsometric parameter herein denoted by $RMSE_{\psi system}(\theta)$ and $RMSE_{\Delta system}(\theta)$. Reference is made to FIG. 8 showing values of $RMSE_{\psi system}(\theta)$ and $RMSE_{\Delta system}(\theta)$ for various estimated angles $\theta$ plotted at intervals of 0.5°. As seen, both curves have a V-shaped behavior with a minimum RMSE value at a common angle candidate $\theta$. Generally, the RMSE values are expected to show minimum values for a common angle illustrating independence of the system parameters of the sample parameter.

Accordingly, the present technique utilizes processing estimated system interference parameters and determining a selected angle providing common minimal error with respect to the known reference data. The single $\theta$ angle value, corresponding to the minimum of both $RMSE_{\psi system}(\theta)$ and $RMSE_{\Delta system}(\theta)$ curves, is assigned as the actual experimental incident angle value $\phi$ for that position $y_F$ on the detector array. In the example, this value is 30° for the position $y_F=102$. The assigned angles may be verified in accordance with data on numerical aperture of the lens unit. By this way, the position to angle transition may be achieved ($y_F=102\rightarrow\phi=30°$).

Figure 9A:
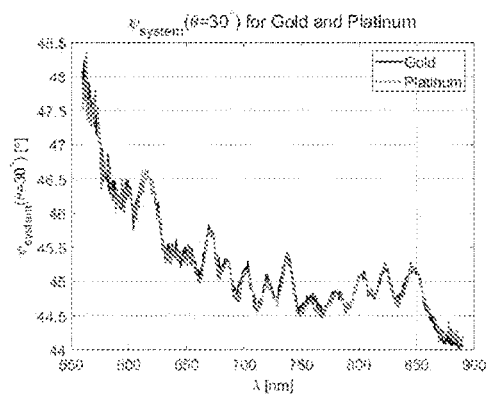
FIGS. 9A and 9B show determined system induced ellipsometry parameters for two different reference measurements as determined for a calibrated specific angle according to the technique of the invention.
Figure 9B:
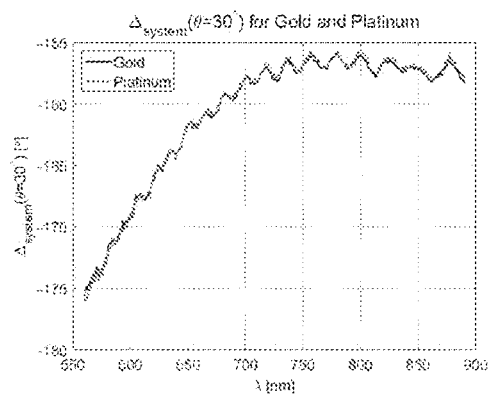

Reference is made to FIGS. 9A and 9B showing graphs of most similar $\psi_{system}(\theta=30°)$ and $\Delta_{system}(\theta=30°)$ candidates from the two reference measurements. As shown, the resulting data on system interference parameters is generally independent of the samples used. Since these ellipsometric system parameters must be functions of wavelength, an improved value of the system interfering parameters $\psi_{system}(\phi=30°)$, $\Delta_{system}(\phi=30°)$ may be determined by averaging the resulting system interfering parameters from the two reference measurements.

Figure 10:
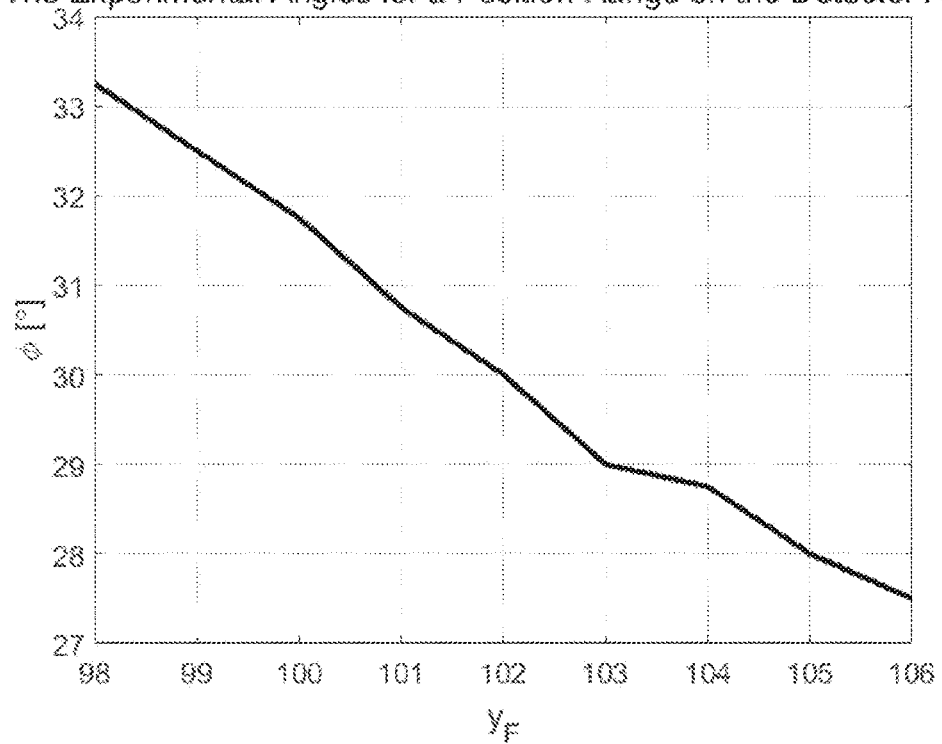
FIG. 10 shows determined angle calibration graph for a range of detector array positions.
Figure 11A:
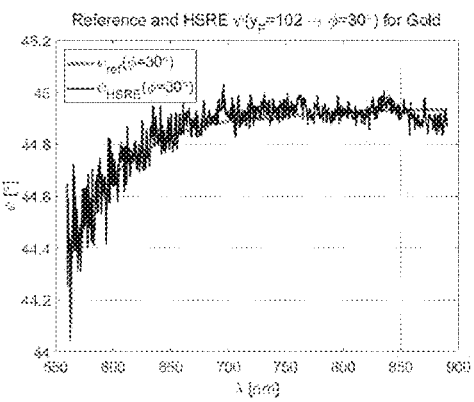
FIGS. 11A to 11D show comparison of ellipsometric parameters between standard ellipsometry measurements and measurements using the system of the present invention.
Figure 11B:
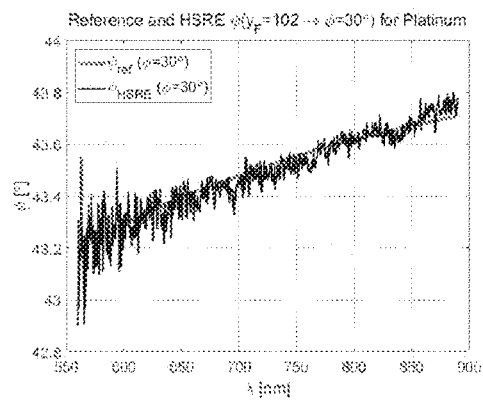
Figure 11C:
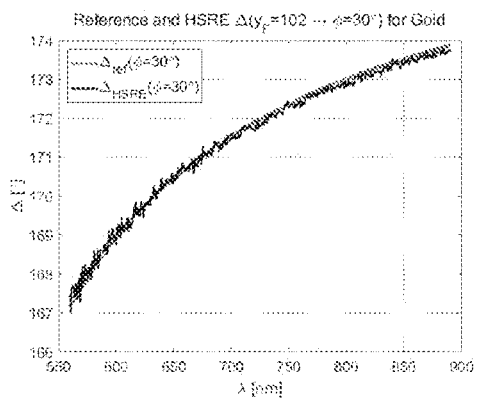
Figure 11D:
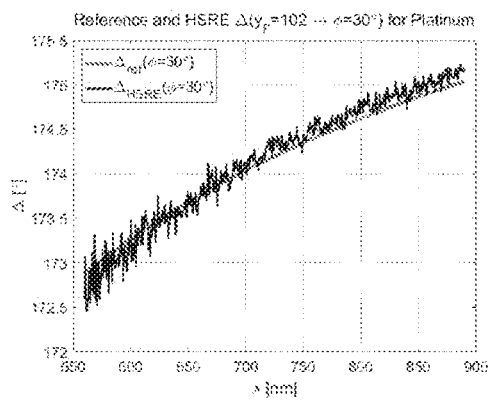

Typically, the technique may include repeating this process for all positions on the Fourier plane. Thus, the position to angle transition $y_F\rightarrow\phi$ on the whole Fourier plane may be determined and all the experimental incident angle values $\phi$ are assigned simultaneously with the relevant values of the system interfering parameters $\psi_{system}(\phi)$, $\Delta_{system}(\phi)$. FIG. 10 illustrates angle calibration graph, showing determined angle values assigned to the different rows of collected data as formed in the image data provided by the detector array. The angle assignment curve shows expected decreasing behavior with increasing $y_F$ values.

In practice, because of natural experimental errors, the ellipsometric system parameters for reference gold and platinum measurements may not be identical as theoretically expected but very similar, as seen in FIGS. 9A and 9B. Accordingly, the present technique utilizes determining minimal RMSE for collected parameters associated with two or more reference samples, and generally also utilizes RMSE values for both parameters. Since these ellipsometric system parameters are functions of wavelength, their final values $\psi_{system}(\phi)$, $\Delta_{system}(\phi)$ may be determined by averaging the results from the two reference measurements, to minimize natural experimental errors. Also, theoretically, the minimum of $RMSE_{\psi system}(\theta)$ and $RMSE_{\Delta system}(\theta)$ curves are expected to point to the exact same angle value $\theta=\phi$. However, in practice this does not always happen because of natural experimental errors. In those situations, the technique utilizes determining an average value based on two different angle values $\theta_\psi$ and $\theta_\Delta$ matching the minimum of $RMSE_{\psi system}(\theta)$ and $RMSE_{\Delta system}(\theta)$ curves respectively. The average value is taken as the experimental incident angle value $\phi$ for the corresponding position $y_F$. These averaging steps have shown to increase accuracy.

Generally, after determining assignments of angle values $\phi$ to the rows of collected data, and system interfering parameters $\psi_{systems}(\phi)$, $\Delta_{system}(\phi)$, the determined calibration data is stored in the memory utility and may be used for calibration of the additional future measurements. The control unit is configured for receiving output image data from the detector array and for retrieving calibration data from the memory unit. Using the retrieved calibration data, the one or more processors of the control unit 500 correct the detected data about the sample using data on system interference parameters, and assigning angle data to the collected image data. The calibration is generally performed once for a stable system, and generally need to be repeated in case of replacing one or more optical elements in the system 50. Further, as mentioned above, the above described technique may be operated by one or more processors associated with the control unit. More specifically, an angle calibration module 510 being software and/or hardware module of the control unit may be selectively operated in accordance with computer readable code containing the instructions for the above described calibration technique.

To validate the findings of the calibration technique and the functioning of the system 50, the reference information may be retrieved from unprocessed experimental ellipsometric parameters of the system 50 ($\psi_{exp}(y_F)$, $\Delta_{exp}(y_F)$) for both reference materials. With determined experimental and system ellipsometric parameters, the reference ellipsometric parameters can be calculated by rearranging the Equations for $\psi_{exp}$ and $\Delta_{exp}$ as follows:

$$\psi_{ref}(\phi) = \tan^{-1}\left(\frac{\tan(\psi_{exp}(\phi))}{\tan(\psi_{system}(\phi))}\right)$$

$$\Delta_{ref}(\phi) = \Delta_{exp}(\phi) - \Delta_{system}(\phi)$$

Reference is made to FIGS. 11A to 11D showing comparison between detected parameters and reference data associated with reference gold and platinum materials. The calculated reference ellipsometric parameters from standard commercial ellipsometer measurements $\psi_{ref}(\phi=30°)$, $\Delta_{ref}(\phi=30)$ and those determined by the system of the present invention shown in the figures show high accuracy and sensitivity in accordance with the current working prototype of HSRE.

Figure 12A:
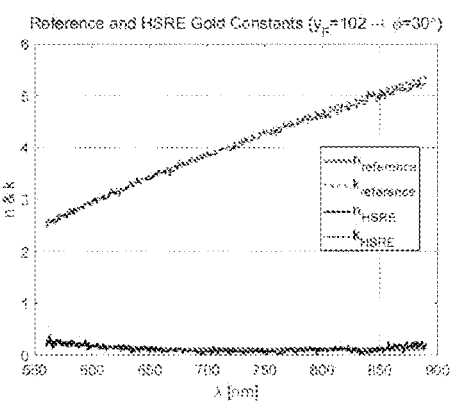
FIGS. 12A and 12B show comparison between complex refractive indices as determined according to the present invention and measured by conventional ellipsometry techniques.
Figure 12B:
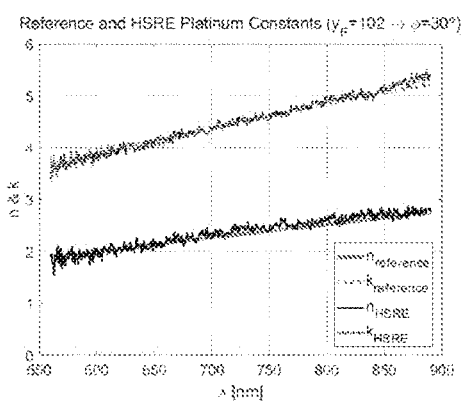

Additionally, reference is made to FIGS. 12A and 12B showing data on complex refractive index of reference samples including gold and platinum respectively, calculated by the ellipsometric parameters $\psi_{HSRE}(\phi)$, $\Delta_{HSRE}(\phi)$ determined by the above described technique. Generally, the complex refractive index N may be determined by:

$$N = n + ik = N_0 \tan(\phi) \left[ 1 - \frac{4\tan(\psi)e^{i\Delta}}{(1 + \tan(\psi)e^{i\Delta})^2} \sin^2(\phi) \right]^{\frac{1}{2}}$$

where N is the complex refractive index of the measured material and $N_0$ is the complex refractive index of the incident medium, which is air in this case ($N_0$=1), n is the real part of the refractive index and k in the imaginary part thereof. No data fitting is applied on the data shown in FIGS. 12A and 12B.

Figure 13A:
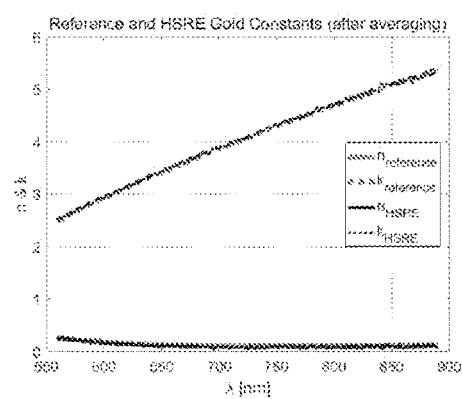
FIGS. 13A and 13B show complex refractive indices averaged over a plurality of measurement angles for two samples. No data fitting procedure is applied.
Figure 13B:
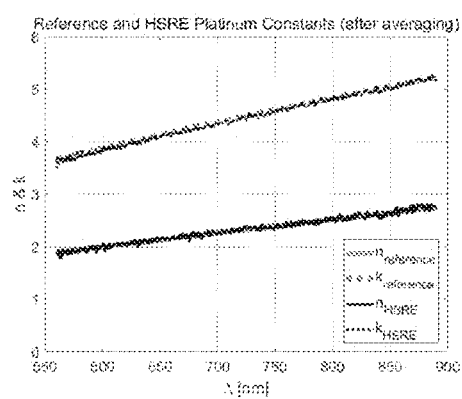

Generally, an advantage of the system 50 according to some embodiments of the invention, is associated with the system's ability to provide ellipsometric measurement for a plurality of incident angles. This may allow further increase in accuracy in determining parameters of a sample, using proper averaging of the sample properties determined using different incident angles. FIGS. 13A and 13B show properly averaged complex refractive index data for gold and platinum reference samples respectively. The figures show complex refractive index data having reduced noise and errors, and in complete agreement with reference data. Accordingly, the control unit 500 may also be configured to provide output data corresponding with average data collected from a plurality of incident angles from the sample.

It should be noted that the technique of the present invention may also be used for characterization of materials having refractive index that depends of angle of incidence of light thereon. To this end, the multi-angular detection of reflected light components enables determining angle-related variation of the refractive index of a sample, thereby enabling defining various complex- and meta-materials and corresponding behavior.

Figure 14:
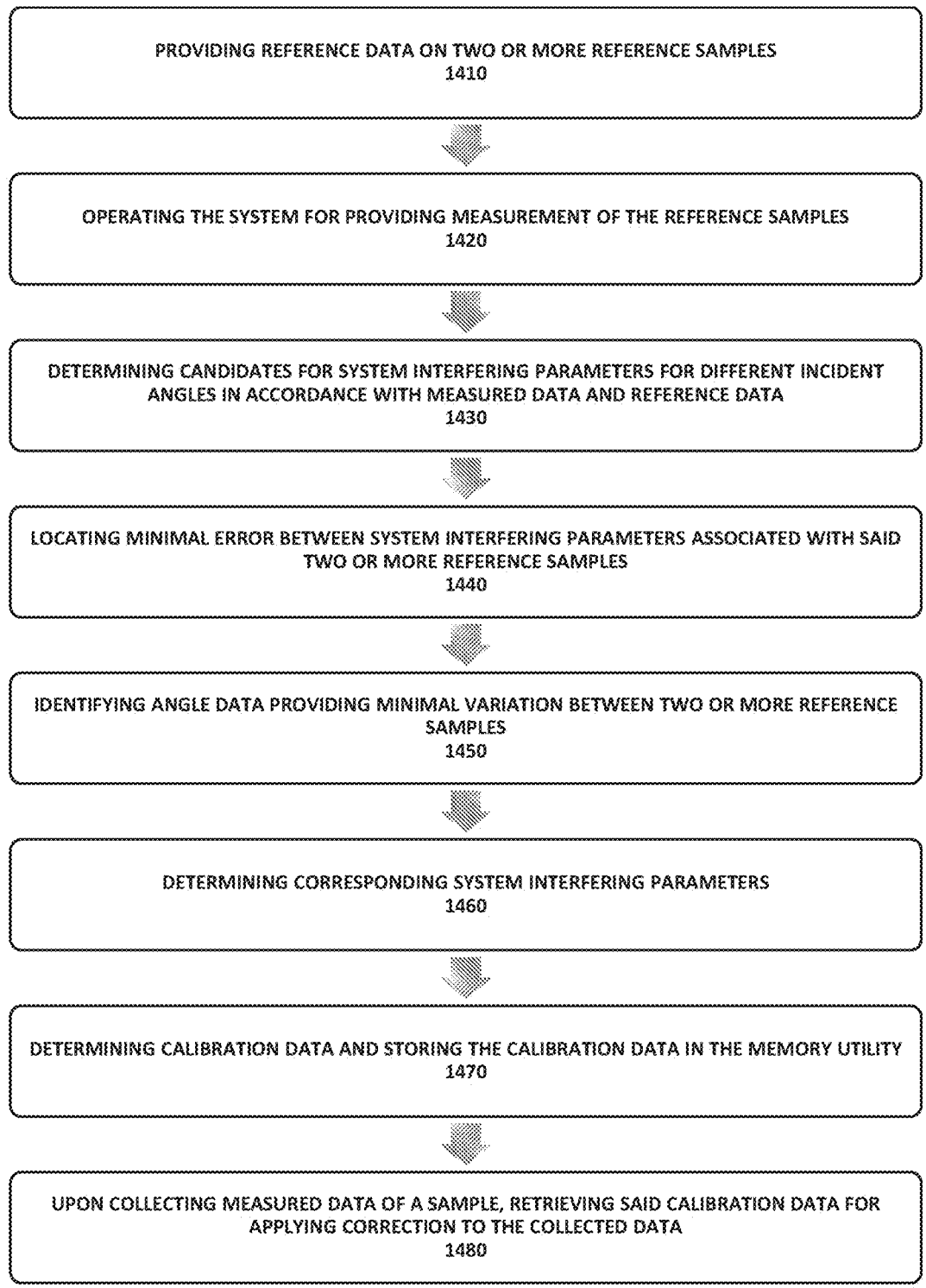
FIG. 14 exemplifies a technique for calibration according to the present invention.

Accordingly, the above described technique provides calibration of the system 50. The calibration technique, or at least some operational actions thereof may be performed by one or more processors, e.g. associated with the control unit. Reference is made to FIG. 14 exemplifying main actions of the technique. As shown reference data of two or more samples is retrieved, 1410, the reference data may be retrieved from literature/database or by providing ellipsometry on the reference samples using conventional techniques. Further, the system 50 is operated for measuring the two or more reference samples providing sample measurement data, 1420. The calibration technique proceeds for calculating, for various rows of the measured data, estimated/candidate data indicative of system interfering parameters, calculated using the un-calibrated measured data and the reference data, 1430. For each angle of candidate data, the technique utilizes determining an error measure between system interfering parameters as determined using reference data on the two or more reference samples, 1440. At this stage, candidate data piece having minimal errors are identified, 1450, enabling to determine correspondence between rows of the measured data and incident angles on the sample, 1460. The determined calibration data is stored for later use, 1470, such as for adjusting data measured by the system and calibrating the measured data, 1480.

In additional to proper calibration, the system and technique of the invention may enable ellipsometry measurements of any arbitrary surface, including surfaces that are not fully flat. Generally, each local measurement utilizes a spot size of a few micrometers, and the sample may be aligned accordingly to each of the measurements. The sample surface alignment is an important part of conventional ellipsometric measurement since the technique is very sensitive to accurate incident angle information. This is true for any kind of ellipsometry, including the system 50 as described above. The conventional way of surface position and angle alignment is typically done by aligning the location of a light beam reflection off the surface. This traditional procedure works only for surfaces that are spatially larger than the light beam spot.

The system 50 according to some embodiments of the invention may be used to illuminate the sample with a micron-sized spot through an objective lens. This non-conventional way of illumination makes the conventional way of sample alignment not valid. Hence, a method for surface alignment must be developed for aligning and measuring micron-scale tilted/curved surfaces. To this end, the control unit 500 may also include a surface alignment module 520 configured for determining variation in surface alignments and generate corresponding output command. The system 50, may also include tilting/rotating platform of the sample holder, enabling variation of sample orientation to support sample alignment and/or accurate ellipsometric measurement. Generally the sample holder may provide lateral shifting of the sample to enable scanning of the sample surface.

Figure 15:
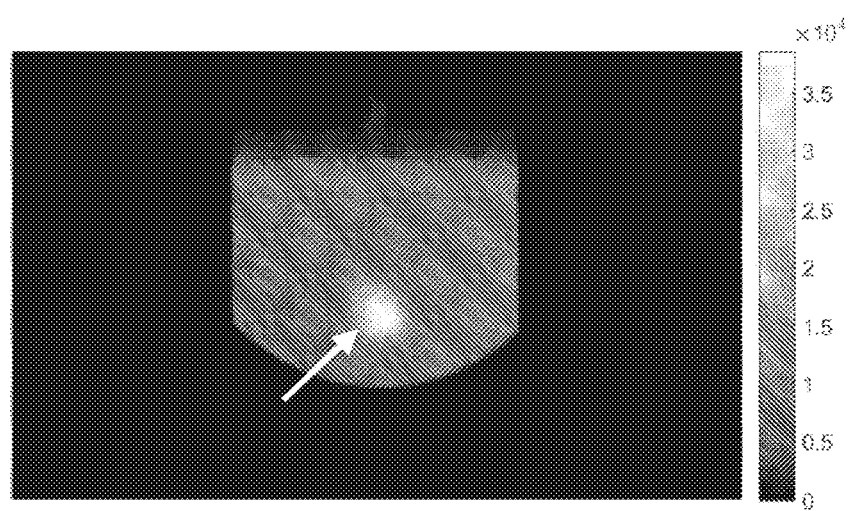
FIG. 15 shows collected signal from narrow beam monochromatic illumination exemplifying location of center of spot in response to variation in surface orientation. The faint large half-circle in the background is the white light illuminated Fourier plane as shown in FIG. 3 and is demonstrated for comparison purpose.
Figure 16:
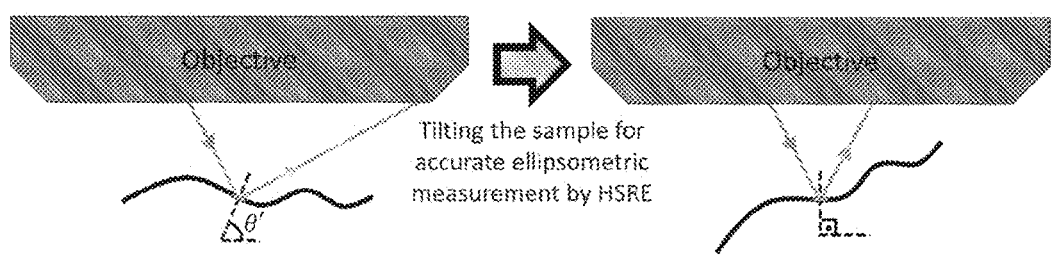
FIG. 16 illustrates a technique of sample surface alignment according to some embodiments of the present invention.

Thus, the surface alignment module 520 is typically configured for operating a Micro-Alignment Technique (MAT), enabling ellipsometric measurement of structures having micron-scale tilted/curved surfaces, which also uses the objective lens Fourier plane information. To this end, the light source unit 140 is operated, e.g. by the control unit 500, for providing collimated laser beam toward the lens unit 120. The beam is configured to partially fill the entrance pupil of lens unit 120, thereby providing reflection light components forming a localized spot on the Fourier plane when compared to the proper measurement. This is shown in FIG. 15 where the localized circular alignment spot is shown associated with laser illumination within the large faint half-circle that is the white light illumination on the Fourier plane, demonstrated for comparison. This kind of local illumination provides benefits when compared to white light illumination of the Fourier plane, as shown also in FIG. 3. As the reflection angles off the surface are sensitive to the tilt of the illuminated area, the location of the laser beam spot on the Fourier plane image is indicative on tilt of the sample. This is illustrated in FIG. 16 showing changes in direction of reflection for tilted samples, this figure shows how sample regions that are detected as tilted may be oriented again to provide actual meaningful results. When the sample surface is tilted, the position of the laser beam on the Fourier plane shifts accordingly, and this in turn results in variation in assigned angles to the collected data rows. Generally, the laser beam spot image can be mathematically fitted to a circle in order to locate the coordinates of its center on the detector array, which then can be used for surface information. Accordingly, the surface alignment module 520 may be operated for determining shift in location of the alignment spot and generate corresponding command to a sample holder platform for varying sample orientation to thereby correct misalignment of the sample, or for correcting local variation in sample surface. Generally, a selected, aligned, location of the alignment spot is recorded marking the desired reference alignment of the sample surface.

During measurement of a sample, the surface alignment module 520 may periodically operate the light source unit 140 for providing alignment illumination utilizing laser light source. The surface alignment module 520 is configured for monitoring location of the alignment spot and determining variation in alignment of the sample. Generally local tilt of the surface alignment may be determined using calibration data, assigning angles of incidence to rows on the measured data. Accordingly, if the surface alignment module 520 identifies misalignments, the surface alignment module 520 can transmit corresponding command to the sample holder for aligning the sample.

In this connection, the surface alignment module 520 may be determining shift in alignment and utilizing the sample holder for correction thereof. Alternatively, the present technique may distinguish between alignment variations that are parallel to the direction of angle variation on the detector array. In such configurations, rotation of the sample may be sufficient to bring the sample tilt to be parallel with direction of angle variation, enabling correction of the collected data in accordance with calibration data, thus accurate ellipsometric data can be obtained without tilting alignment of the sample.

Thus, the technique enables scanning a sample while mapping of any arbitrary landscape. By tilting the sample accordingly and refocusing in order to get to the reference laser beam position in the Fourier plane, any arbitrary surface can be aligned to sit under the objective lens the same way as the reference materials during the calibration technique. This alignment makes the determined system parameters in the calibration technique valid and hence accurate high spatial resolution ellipsometric measurement can be performed for any micro-tilted/curved arbitrary landscape as long as the landscape spatial pitch is larger than the spatial-resolution of the measurement system 50, as also illustrated in FIG. 16. On the other hand, rotating the sample accordingly in order to bring the surface tilt to be parallel with direction of angle variation, also allows determining the surface tilt as well as determining accurate ellipsometric data of the surface. By doing either of these as a scan, an arbitrary landscape can be mapped and local ellipsometric data can be obtained.

Figure 17:
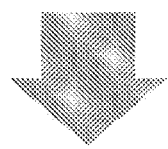
FIG. 17 shows a flowchart exemplifying sample alignment according to some embodiments of the invention.
Figure 17:
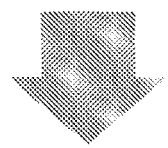
Figure 17:
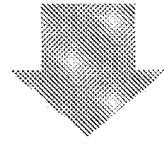

The technique for sample alignment is shown in FIG. 17 as a flowchart. As shows, the surface alignment module 520 may operate the light source unit for providing collimated light beam for illuminating the sample and generating an alignment spot on the detector array, 1710; the surface alignment module 520 is configured for detecting the alignment spot and determining location variation thereof, and corresponding angle of misalignment, 1720; accordingly, the surface alignment module 520 generates system command to the sample holder to vary orientation of the sample to properly align surface thereof, 1730; and the system may proceed with measurement, 1740.

Figure 18A:
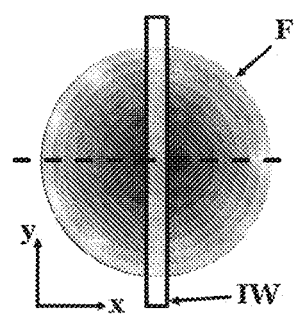
FIGS. 18A to 18C exemplify misalignment of sample surface and certain alignment technique.
Figure 18B:
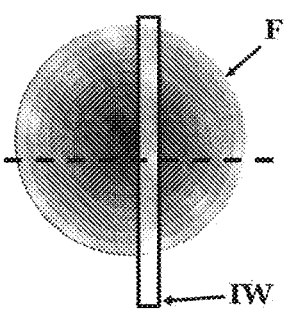
Figure 18C:
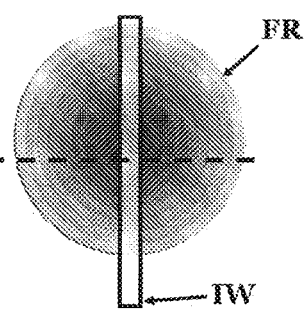

Generally, as indicated above, the alignment of the sample may utilize variation in orientation of a sample holder. Alternatively, certain rotation of the sample may be used to provide the sample at a position that the collected image data is sufficient and may be corrected without additional orientation variation of the sample. FIGS. 18A to 18C illustrate sample misalignment and partial alignment according to some embodiments of the invention. FIG. 18A shows rings associated with Fourier image of the sample FR and a region corresponding to slit IW associated with the detection unit and representing the part of the data that the collected is to be processed. In FIG. 18B the sample is misaligned such that center of the Fourier rings FR is outside the inspected region IW. Accordingly, the technique may rotate the sample holder to provide imaging condition illustrated in FIG. 18C where the center of the Fourier rings FR is within the inspected region IW. At this stage, the tilt of the surface may be determined and the calibration data may be software corrected for obtaining accurate ellipsometric data, without the need for tilting alignment of the sample surface.

Additionally, the above mentioned alignment of the Fourier plane FR center with the slit IW may also be performed, generally in case of small tilts of the sample surface, by slight variation of one or more of the optical elements of the system, and/or using software correction, for determining accurate properties of the sample.

As indicated above, the system 50 of the present invention can record multiple incident angle ellipsometric information in a single-shot measurement per spatial location on a sample surface, and it is known that the optical constants for most materials are incident angle independent. So when evaluating the results, system 50 calculates the optical constants for multiple incident angles separately and averages in order to decrease the noise and hence increase accuracy. This is proven to be an efficient way to decrease random noise in the results.

The incident angle range that the optical constants results will be averaged over is chosen carefully by taking into account the noise level of every incident angle. By definition, the larger incident angle values (closer to the Brewster's angle) will have less noisy results and will be selected to be averaged.

Additionally, in the system 50, a D-Shaped mirror is used as a substitute for the conventional beamsplitter. The incident light entering the objective entrance pupil passes from above the mirror, and the reflected light off the sample returns and gets reflected from the D-shaped mirror, reaching the detector array.

By this way, the interference effects of the beamsplitter are avoided and hence a cleaner signal is obtained. Also by eliminating the transmission and reflection losses of the beamsplitter, a higher intensity signal is achieved resulting in better SNR (Signal-to-Noise Ratio) values. It is also important to note that D-shaped mirrors are much cheaper than any beamsplitter on the market, hence decreasing the overall cost of the system.

This substitution results in imaging only the top/bottom half of the Fourier plane, but causes no loss of information as the Fourier plane is symmetrical around the horizontal diameter axis.

An additional variation in the optical configuration of the system 50 according to the present invention is the use of a Fresnel rhomb quarter-wave retarder as a substitute for the conventional quarter-wave plate. By this way, the interference effects of conventional quarter-wave plates are avoided and hence a cleaner signal is obtained. Also, Fresnel rhomb retarders have a more consistent retardation for a broader wavelength range (400-1550 nm for the one used in current system 50) when compared to conventional quarter-wave plates. It is also important to note that Fresnel rhomb quarter-wave retarders are much cheaper than any quarter-wave plate on the market, hence decreasing the overall cost of the system.

The only down side of Fresnel rhomb quarter-wave retarders is that they displace the beam and are not suitable for rotating as this will lead to the displacement of the optical path. In system 50, this problem is solved by rotating the former polarizer instead of the quarter-wave retarder in order to obtain the necessary incident polarizations. This method is proven to be effective and has no negative consequence while enabling the effective use of more advantageous but beam displacing Fresnel rhomb quarter-wave retarders.

Thus, the technique of the invention provides several advantages over the existing conventional ellipsometry techniques:

Unlike standard ellipsometers, the system 50 uses a single high numerical aperture objective lens, has no mechanical moving parts (except the scanning sample stage), and is built in a regular microscope geometry. Therefore the system 50 may be much cheaper to manufacture, simpler and more compact, and is easy to integrate with high resolution optical imaging microscopes, enhancing their functionality and versatility.

Unlike conventional ellipsometers, there is no need to adjust the incident angles mechanically thanks to the objective lens. With a single objective lens having a NA of 0.9 for example, the system 50 measures ellipsometric parameters in a wide range of angles simultaneously, i.e., it can measure all angles from 0 to ~65 degrees in a single-shot. Hence, information of multiple incident angles is obtained by a single measurement. This makes system 50 much simpler, more accurate, and much faster in gaining useful data about the sample.

System 50 uses a simple broadband incoherent white source and does not require expensive tunable laser sources or monochromators like some other ellipsometers. The HSRE measures all the ellipsometric information over a very wide spectral range (450-900 nm in our current working device) in a single-shot measurement. This yields a lot of spectral information with a very fast acquisition rate for each measured point.

The system 50 can easily scan samples and make consecutive ellipsometric measurements to map the complex refractive index or the thickness values of the desired area with high spatial resolution.

The system 50 uses a unique micro-alignment technique that enables high spatial resolution ellipsometric analysis of micron-scale tilted/curved structures. Our ellipsometer can detect, align, and measure areas with surface tilts even less than ~1 degree and measure samples with varying tilt/curved landscape as long as the landscape spatial pitch is larger than the spatial resolution of the HSRE.

Generally, the system 50 according to the present invention may provide a spatial resolution of ~7 μm FWHM, with an objective lens of NA=0.65 and white incoherent light. This resolution can be increased further with the use of a higher NA objective lens. Furthermore, using light in UV spectrum will also decrease the spot size dramatically, hence increasing the spatial resolution.

Figure 19A:
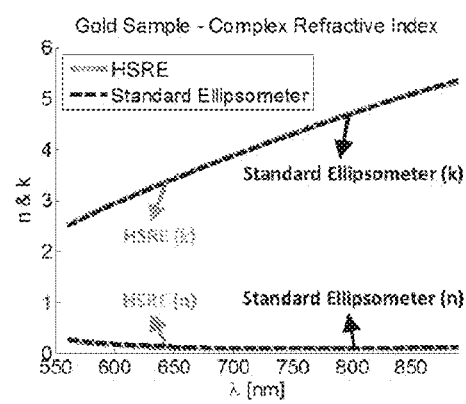
FIGS. 19A and 19B show complex refractive indices measured using ellipsometry system according to the present invention and standard conventional ellipsometry techniques for Gold (FIG. 19A) and Platinum (FIG. 19B). Mathematical data fitting procedure is applied.
Figure 19B:
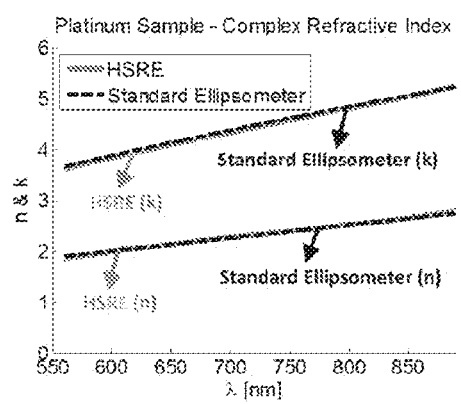

The complex refractive index of optically thick, large samples of pure gold and platinum samples are measured both by the system 50 and by a standard commercial ellipsometer (J. A. Woollam Co./alpha-SE) and the results are compared after application of mathematical fitting, as shown in FIGS. 19A and 19B. The accuracy of the system 50 is shown to be at least comparable to conventional ellipsometry techniques.

Figure 20A:
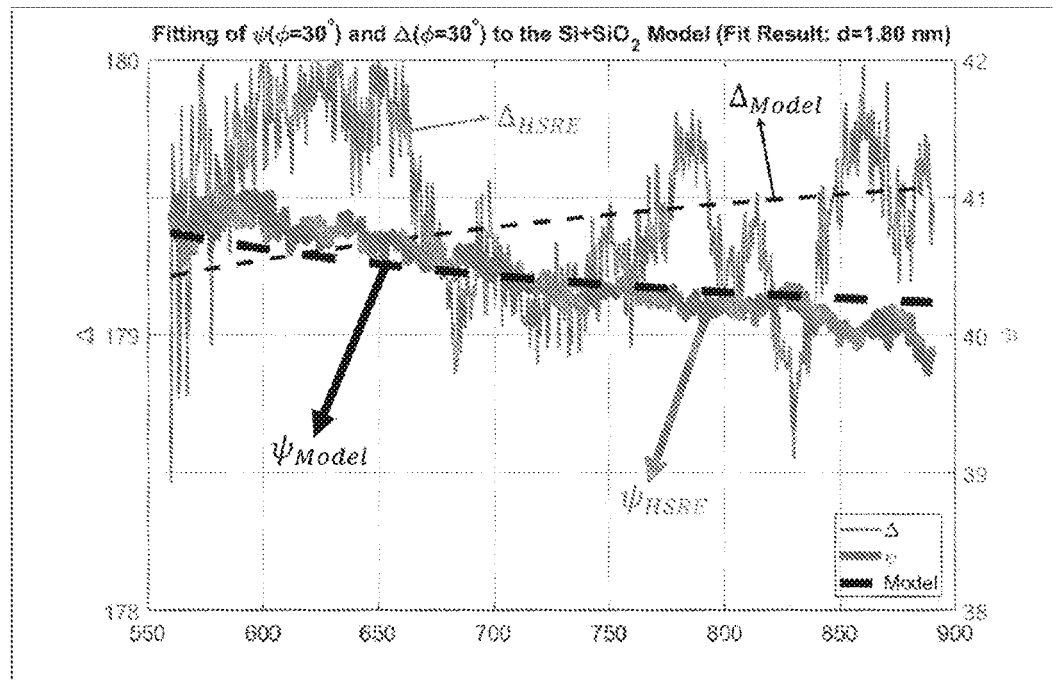
FIGS. 20A and 20B show oxide thickness measurements; where
Figure 20B:
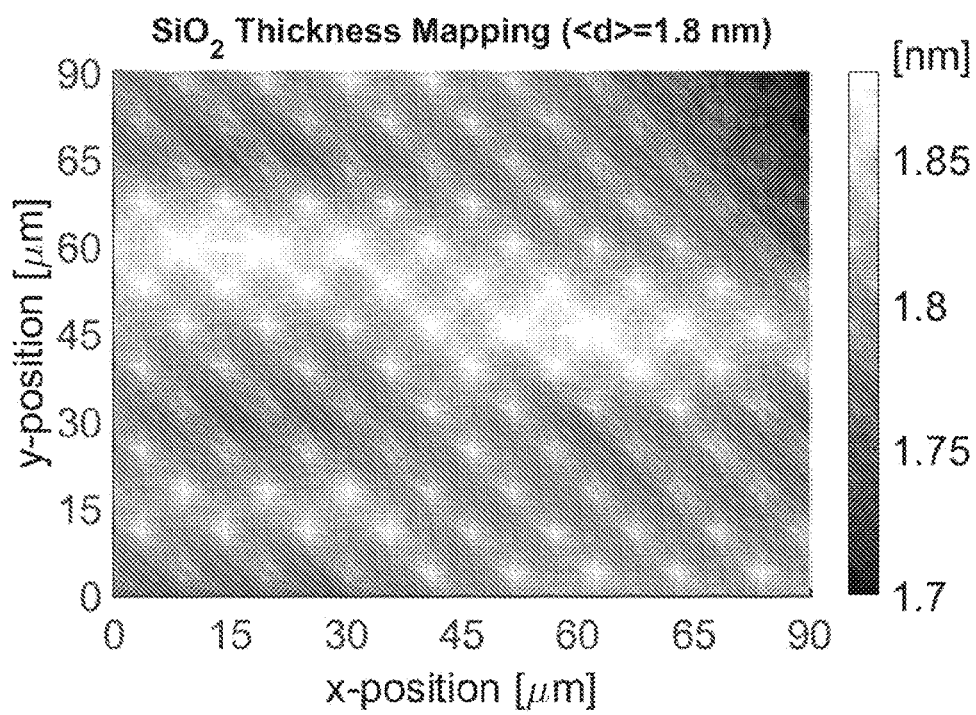

In FIGS. 20A and 20B, a silicon substrate with a native silicon dioxide ($SiO_2$) layer is measured by the system 50 and the determined ellipsometric parameters from the most accurate detection position is fitted to a physical model in order to determine the thin oxide layer thickness, as shown in FIG. 20A. The thickness of the native oxide layer is calculated to be 1.80 nm by HSRE, for a single measurement point with a spot size of ~7 μm FWHM. Scanning an area of ~90×90 μm$^2$ by 7×7=49 measurement points and application of similar fitting to all points resulted in determining and mapping the local thickness variations with high spatial resolution, as shown in FIG. 20B. The average off all measurement points is calculated to be <d>=1.80 nm. The same sample is measured by a standard commercial ellipsometer (J. A. Woollam Co./alpha-SE) having spot size of ~3000 μm and the oxide layer thickness result is given to be 1.80±0.018 nm.

Gold circle having radius of 10 microns deposited on a silicon substrate is used for scanning by HSRE, in order to map the complex refractive index values and demonstrate the high spatial resolution performance of the system. The sample structure and the mapped area is shown in FIG. 21. The area is scanned by 16×16=256 pixels by the spot size of ~7 μm FWHM and a step size of 2.5 μm. The scanning results are shown in FIGS. 22A and 22B for real and imaginary parts of the complex refractive index.

Figure 23:
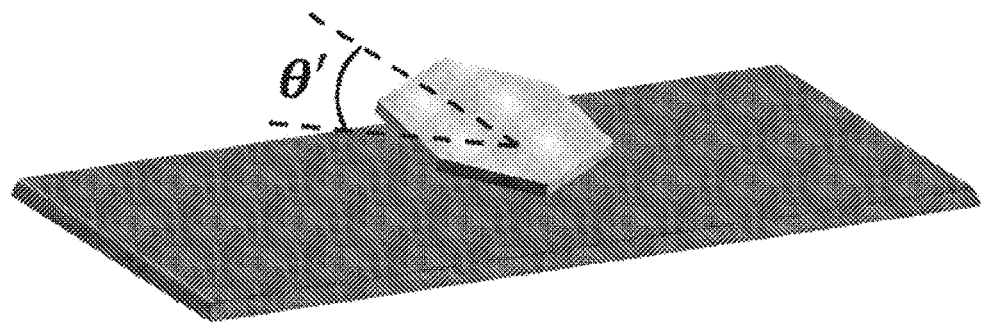
FIG. 23 illustrates small angular variation of a gold microplate.
Figure 24A:
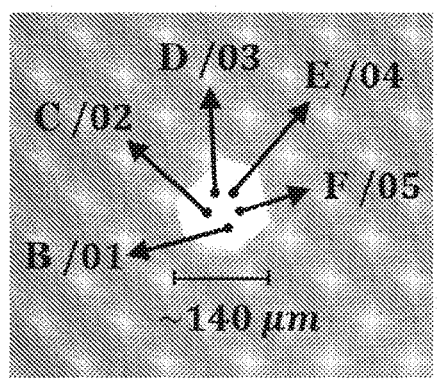
FIGS. 24A to 24F show microscope image of a gold flake (FIG. 24A) and corresponding ellipsometric measured complex refractive indices corresponding with multiple-spots of the gold flake (FIGS. 24B to 24F) measured using the system of the present invention and utilizing correction for tilt of sample's angle.
Figure 24B:
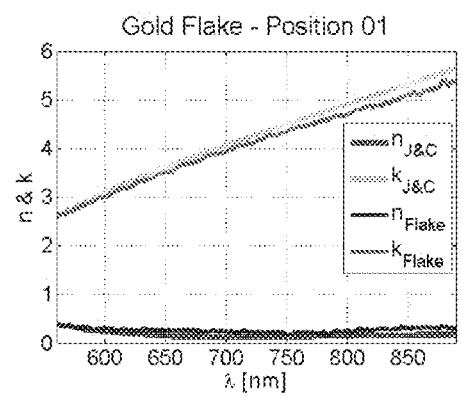
Figure 24C:
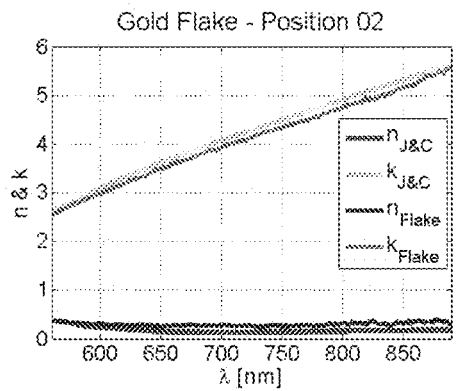
Figure 24D:
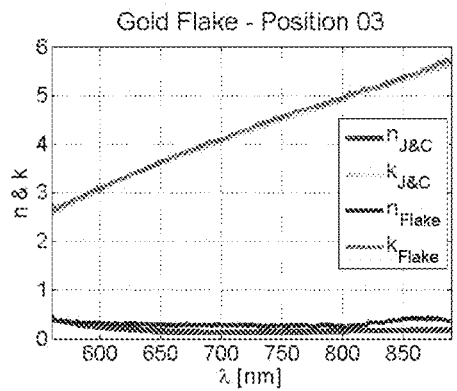
Figure 24E:
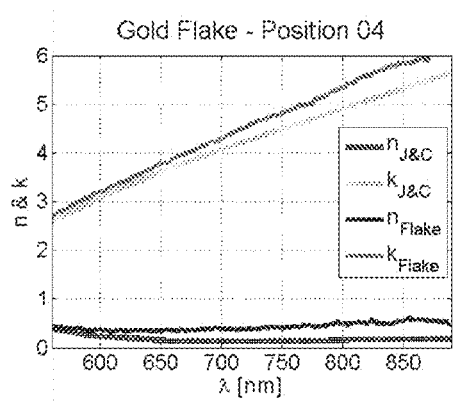
Figure 24F:
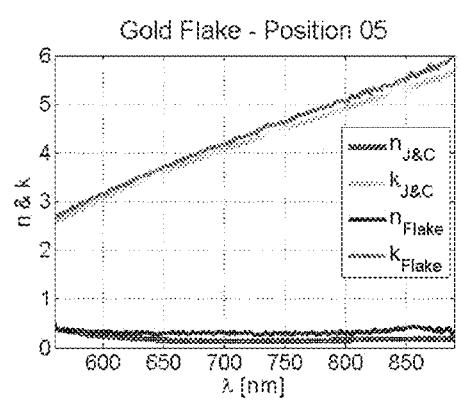

Additional measurements were conducted on clean and high quality gold flakes produced for next generation electo-optic and plasmonic applications in nanophotonics and nanoplasmonics. The optical properties of the gold flakes were measured. The gold flakes come in the shape of gold microplates laying on a substrate with a small arbitrary angle, as illustrated in FIG. 23. To characterize the quality of these microplates, it is important to know the homogeneity and the optical properties of these flakes and compare them to Johnson&Christy gold standard. Our HSRE was able to account for the arbitrary angle and make successful ellipsometric measurements of 5 different points on a single flake to characterize its homogeneity. The results with comparison to Johnson&Christy gold standard are shown in FIGS. 24A to 24F. Specifically, FIG. 24A shows a gold flake deposited at a tilt angle on silicon substrate and marked locations B-F. The flake is about 140 μm in diameter. FIGS. 24B to 24F show respectively measurement of real and imaginary parts of the complex refractive index measured at marked spots B to F on the gold flake. These measurements show good agreement with the literature gold standard.

Figure 25A:
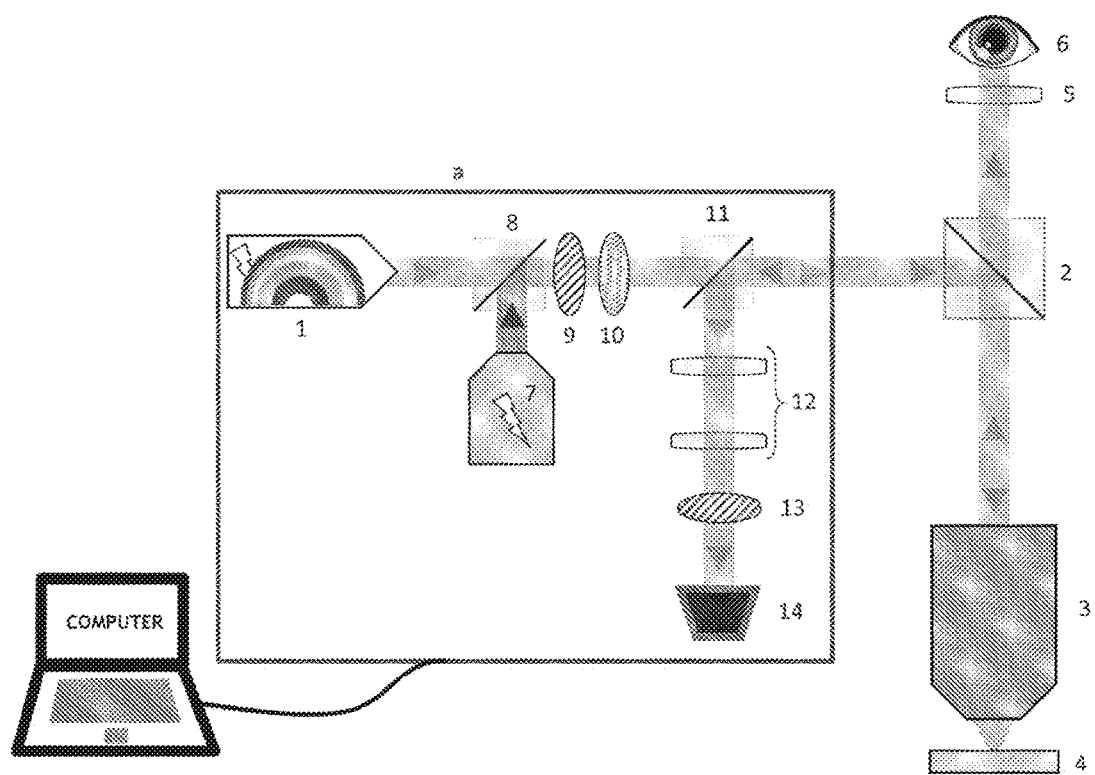
FIGS. 25A and 25B exemplify ellipsometry attachment module configurations according to some embodiments of the present invention.
Figure 25B:
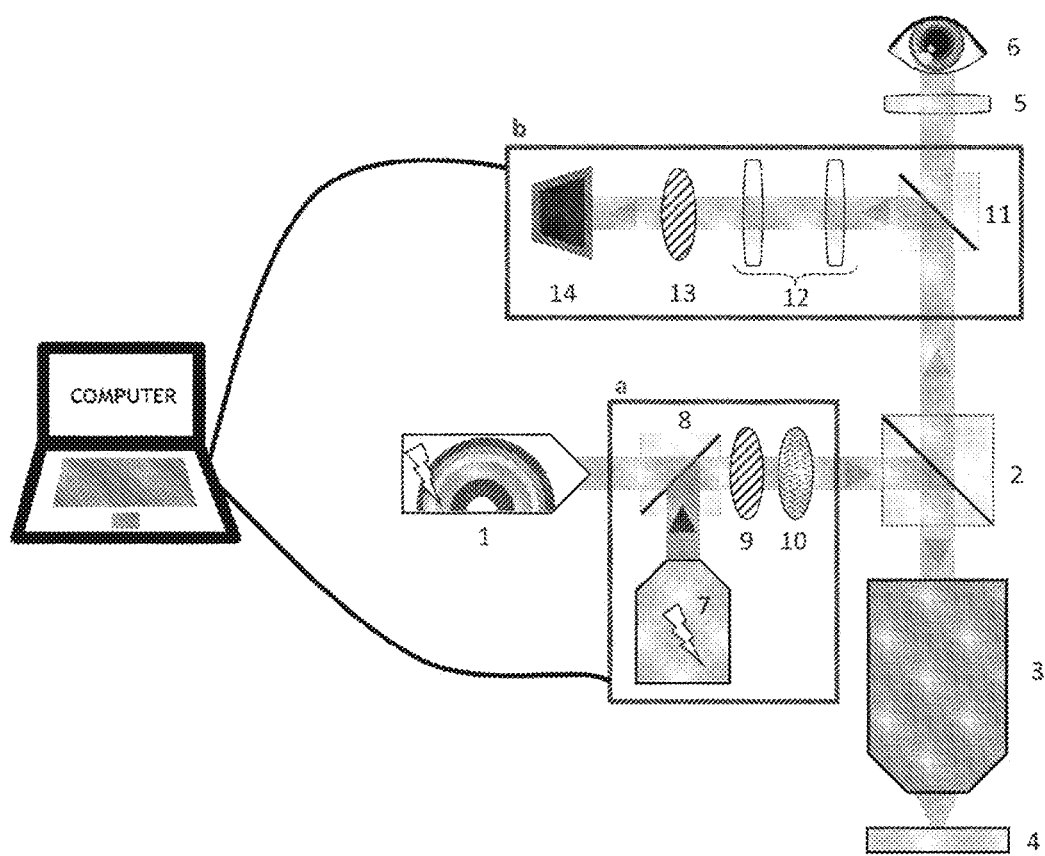

The above described ellipsometry system and calibration technique may provide for a simple and robust module suitable to be attached to any microscope unit to provide ellipsometry measurement by simple and convenient technique. Reference is made to FIGS. 25A and 25B exemplifying two configurations of an attachment module according to some embodiments of the invention.

FIG. 25A illustrates an optical microscope unit including an objective lens 3, beamsplitter 2, lens arrangement and eye piece 5 and configured to enable a user 6 to view features of a sample located on a sample holder 4. The attachment module a includes in this example a white light source 1, possibly including laser light source 7, polarizer 9 and compensator (e.g. λ/4 retarder) 10 providing polarizer unit, as well as an analyzer 13 and detector array 14 configured for detecting light returning from the sample at Fourier plane. As shown, the module may also include lens arrangement 12 for adjusting location of the detector array and imaging the Fourier plane thereon and suitable beamsplitter (or flip mirror) 8 and beamsplitter (or D-shaped mirror) 11 for enabling combination of the light sources, and separating the collection module from the illumination module. Generally, the module, and specifically, the polarization modification and analyzing components and detector array thereof are connectable to a computer (control unit) configured to operate the module for ellipsometry measurements as described above. FIG. 25B exemplifies another configuration of the ellipsometer module where the collection unit b is separated from the illumination unit a. Elements and features of the module are similar to that of FIG. 25A.

Thus the present invention provides a system for use in high spatial resolution ellipsometry, and techniques for use and calibration thereof. The system utilizes optical configuration for obtaining high spatial resolution, multi-angle, optical monitoring of sample properties. The system may generally comprise a control unit, configured as a computer system and capable of running computer executable code for performing operational steps for calibrating angular variation determined by the system. In some configurations, the system may also operate to properly align a non-flat sample to be inspected to obtain accurate ellipsometric data.

The invention claimed is:

1. A system for use in optical monitoring of a sample, the system comprising:
   a light source unit configured for providing substantially collimated optical illumination of a selected wavelength range propagating along a first optical axis;
   a polarization modulator located in an optical path of light propagating along said first optical axis and configured for selectively varying polarization of light passing therethrough;
   a lens unit located in the optical path along said first optical axis and configured for focusing light onto an illumination spot on a surface of the sample located on a dedicated sample holder, and for collection of light components returning from said surface of the sample;
   a light collector configured for collecting light returning from the sample, the light collector comprising:
      a polarization analyzer unit, and
      a detector comprising one or more detector arrays configured for generating output image data associated with Fourier plane imaging with respect to surface of the sample; and
   a controller comprising at least one processor utility, a memory utility, and a calibrator, said calibrator being configured for carrying out the following: selectively carrying out calibration of collected angular data of said image data and for storing system calibration data in said memory utility; and receiving data from the detector and processing the data received from the detector in accordance with said system calibration data for assigning data on incident angle of light components with corresponding data points of the output image data;
   wherein said calibrator is configured for:
      retrieving reference data about at least two reference samples, said reference data being indicative of complex refractive index of the reference samples;
      generating system command requesting for collection of ellipsometry data of said at least two reference samples using the system;
      processing generated image data pieces corresponding with said at least two reference samples in accordance with said reference data, said processing comprising simultaneously determining for each measurement point corresponding to an incident angle, data about the system polarization interfering parameters and value of angle of incidence in accordance with corresponding parameters of the reference sample, to thereby generate calibration data, and storing said generated calibration data in the memory utility.

2. The system of claim 1, wherein said first optical axis is shifted laterally with respect to optical axis of the lens unit, light components returning from surface of the sample being collected to propagate along a second optical axis spaced apart from said first optical axis at vicinity of the lens unit.

3. The system of claim 1, wherein said light source unit is configured to provide optical illumination having ring shaped cross section on the Fourier plane with respect to the sample.

4. The system of claim 1, wherein the polarization modulator comprises at least one linear polarizer, said at least one linear polarizer is rotatable about general axis defined by direction of propagation of light therethrough, thereby enabling variation of polarization direction.

5. The system of claim 1, wherein said polarization modulator comprises and at least one linear polarizer and at least one quarter-wave retarder, said at least one quarter-wave retarder being rotatable to be selectively aligned with respect to the linear polarizer to vary polarization state of the illumination enabling selection of linear and circular polarization states.

6. The system of claim 1, wherein said one or more detector arrays of the detector are located in the Fourier plane with respect to the surface of the sample, said light collector comprising an optical imager configured for imaging the Fourier plane onto said one or more detector arrays.

7. The system of claim 1, wherein said light source unit is configured for providing polychromatic illumination having a selected wavelength range and composition, said collector comprises a spectrograph unit configured for spatially separating wavelengths of light collected from the sample thereby providing output data comprising wavelength resolved ellipsometric data.

8. The system of claim 7, wherein said collector is configured to provide output image data being in the form of intensity map of light collected with respect to a plurality of incidence angles and a plurality of wavelengths.

9. The system of claim 1, wherein said light source comprises a monochromatic laser light source, said controller being configured and operable for determining a center of spot of light components of a selected wavelength reflected from a surface of the sample as detected by the detector unit, and comparing said center of the spot to a reference spot location corresponding to a level of alignment of the sample surface; and upon detection of a shift of a location of said center of the spot, generating a corresponding command for correcting tilt angle of the surface of the sample.

10. The system of claim 9, wherein said controller is further configured for recording data indicative of determined tilt angle for one or more measurement locations of the sample, thereby generating surface structure map of the sample.

11. The system of claim 9, wherein the system comprises a sample holder unit configured for providing sample platform located in optical path of light directed by said lens unit, said sample holder unit being configured for selectively applying sample alignment to the sample in accordance with the corresponding command provided by the controller.

12. The system of claim 9, wherein said corresponding command for correcting detected tilt comprises at least one of sample rotation and tilt correction.

13. A method for use in calibrating of ellipsometry system, the method comprising:
   providing reference data on at least two reference samples, said data being indicative of complex refractive index of the reference samples;
   collecting ellipsometry data for a plurality of angular directions of said at least two reference samples using said ellipsometry system, thereby generating output data having a plurality of data pieces, each associated with unknown angular direction;

for each data piece corresponding to an unknown angular direction, determining simultaneously system parameters and angle of incidence in accordance with corresponding parameters of the reference data to thereby determine calibration data.

14. The method of claim 13, wherein said reference data on said at least two reference samples being indicative on ellipsometric reflection ($\psi$) and phase shift ($\Delta$) parameters of the at least two sample for a plurality of wavelengths corresponding to wavelength range of the ellipsometry system.

15. The method of claim 13, wherein said reference data on said at least two reference samples comprises data on complex refractive index of the reference samples, said method comprises determining corresponding ellipsometric reflection ($\psi$) and phase shift ($\Delta$) parameters of the at least two sample for a plurality of wavelengths corresponding to wavelength range of the ellipsometry system based on said data on complex refractive index of the reference samples.

16. The method of claim 13, wherein said providing said reference data on said at least two reference sample comprises determining ellipsometric data of the at least two reference samples for a plurality of angles of incidence within a selected predetermined range.

17. The method of claim 13, wherein said system parameters and angles of incidence are determined to be irrespective of reference sample properties.

18. The method of claim 13, further comprising assigning one or more candidate angles of incidence to each unknown angular direction of the measured data, and processing said measured data in accordance with said reference data for determining at least one corresponding value of system parameters; said determining simultaneously system parameters and angle of incidence comprises determining minimal variation between said at least one value of the system parameters determined by reference data of the at least two reference samples, thereby determining system parameters and angle of incidence for each data piece simultaneously.

19. An optical module configured as microscope attachment for providing ellipsometry measurement of a sample, the module comprising:
an illumination channel connectable to a light source and comprising at least a polarization modulator,
a collection channel comprising a polarization analyzer unit and a detector array, and
a control unit comprising a memory utility and at least one processor utility comprising an angle calibrator;
the illumination channel being configured to provide collimated illumination directed along a first general optical axis at an objective lens of the microscope such that said first optical axis is parallel with respect to main optical axis of the objective lens; the collection channel being configured for collecting light from said objective lens along a second general optical axis being parallel to said main optical axis, transmitting said collected light through said polarization analyzer unit and collecting said light on the detector array being located at a Fourier conjugate optical plane with respect to sample being inspected, thereby providing image data associated with high spatial resolution ellipsometry measurement;
wherein said angle calibrator is configured for selectively carrying out calibration of collected angular data of said image data by:
retrieving reference data about at least two reference sample, said reference data being indicative of complex refractive index of the reference samples;
generating system command requesting for collection of ellipsometry data of said at least two reference samples using the system;
processing generated image data pieces corresponding with said at least two reference samples in accordance with said reference data, said processing comprises simultaneously determining for each measurement point corresponding to an incident angle, system parameters and corresponding angle of incidence in accordance with corresponding parameters of the reference sample to thereby generate calibration data, and storing said generated calibration data in a memory utility;
the control unit being configured for receiving data from the detector array and for processing said data in accordance with said system calibration data for assigning data on incident angle of light components with corresponding data points of the output image data.

20. The optical module of claim 19, wherein said light source unit is configured for providing polychromatic illumination having a selected wavelength range and composition, said collector comprises a spectrograph unit configured for spatially separating wavelengths of light collected from the sample thereby providing output data comprising wavelength resolved ellipsometric data.

* * * * *